(12) United States Patent
Park et al.

(10) Patent No.: US 12,095,684 B2
(45) Date of Patent: Sep. 17, 2024

(54) METHOD AND APPARATUS FOR RECEIVING EHT PPDU IN WIRELESS LAN SYSTEM

(71) Applicant: LG ELECTRONICS INC., Seoul (KR)

(72) Inventors: Eunsung Park, Seoul (KR); Jinsoo Choi, Seoul (KR); Dongguk Lim, Seoul (KR); Jinmin Kim, Seoul (KR); Sunwoong Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 496 days.

(21) Appl. No.: 17/429,292

(22) PCT Filed: Feb. 12, 2020

(86) PCT No.: PCT/KR2020/001948
§ 371 (c)(1),
(2) Date: Aug. 6, 2021

(87) PCT Pub. No.: WO2020/171463
PCT Pub. Date: Aug. 27, 2020

(65) Prior Publication Data
US 2022/0140962 A1 May 5, 2022

(30) Foreign Application Priority Data
Feb. 19, 2019 (KR) .................. 10-2019-0019168

(51) Int. Cl.
*H04L 5/00* (2006.01)

(52) U.S. Cl.
CPC .......... *H04L 5/0023* (2013.01); *H04L 5/0048* (2013.01)

(58) Field of Classification Search
CPC ... H04L 5/0023; H04L 5/0048; H04L 5/0055; H04L 5/0044; H04L 5/0094; H04L 27/2603; H04L 27/2613; H04L 27/262; H04W 84/12; H04W 72/0453
See application file for complete search history.

(56) References Cited

U.S. PATENT DOCUMENTS

| | | | |
|---|---|---|---|
| 2013/0259017 A1 | 10/2013 | Zhang et al. | |
| 2019/0041509 A1* | 2/2019 | Jiang | H04W 24/10 |
| 2019/0044778 A1 | 2/2019 | Park et al. | |
| 2019/0045461 A1* | 2/2019 | Fang | H04W 52/245 |

(Continued)

FOREIGN PATENT DOCUMENTS

WO 2019/032216 A1 2/2019

*Primary Examiner* — Eunsook Choi
(74) *Attorney, Agent, or Firm* — BRYAN CAVE LEIGHTON PAISNER LLP

(57) ABSTRACT

Proposed are a method and an apparatus for receiving an EHT PPDU in a wireless LAN system. Specifically, a reception STA receives an EHT PPDU including an STF signal from a transmission STA through a 320 MHz band or a 160+160 MHz band. The reception STA decodes the EHT PPDU. The STF signal is generated on the basis of an EHT STF sequence for the 320 MHz band or the 160+160 MHz band. The EHT STF sequence for the 320 MHz band is a first sequence in which a preconfigured M sequence is repeated, and is defined as $\{M\ -1\ -M\ -1\ M\ -1\ M\ 0\ -M\ 1\ -M\ 1\ -M\ 1\ M\ 0\ -M\ 1\ M\ 1\ -M\ 1\ -M\ 0\ M\ -1\ M\ -1\ M\ -1\ -M\}*(1+j)/\mathrm{sqrt}(2)$.

18 Claims, 26 Drawing Sheets

(56) References Cited

U.S. PATENT DOCUMENTS

| | | | |
|---|---|---|---|
| 2019/0053240 A1* | 2/2019 | Park | H04L 27/2626 |
| 2019/0289612 A1* | 9/2019 | Chen | H04L 27/2613 |
| 2021/0392660 A1* | 12/2021 | Chen | H04L 27/2613 |

* cited by examiner (a)

| 8μs | 8μs | 4μs | 4μs | | | | | | |
|---|---|---|---|---|---|---|---|---|---|
| L-LTF | L-STF | L-SIG | RL-SIG | SIG A | SIG B | STF | LTF | Data | PE |

METHOD AND APPARATUS FOR RECEIVING EHT PPDU IN WIRELESS LAN SYSTEM

This application is the National Stage filing under 35 U.S.C. 371 of International Application No. PCT/KR2020/001948, filed on Feb. 12, 2020, which claims the benefit of Korean Patent Application No. 10-2019-0019168, filed on Feb. 19, 2019, the contents of which are all hereby incorporated by reference herein in their entirety.

BACKGROUND

Field of the Disclosure

The present specification relates to a technique for receiving an EHT PPDU in a wireless LAN system, and more particularly, to a method and an apparatus for receiving an EHT PPDU by setting an STF sequence having an optimal PAPR in a broadband tone plan that repeats the tone plan defined in the EHT wireless LAN system.

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In the new wireless LAN standard, an increased number of spatial streams may be used. In this case, in order to properly use the increased number of spatial streams, a signaling technique in the WLAN system may need to be improved.

SUMMARY

The present specification proposes a method and apparatus for receiving an EHT PPDU in a WLAN system.

An example of the present specification proposes a method for receiving an EHT PPDU.

The present embodiment may be performed in a network environment in which a next-generation wireless LAN system is supported. The next-generation wireless LAN system is a wireless LAN system improved from the 802.11ax system, and may satisfy backward compatibility with the 802.11ax system.

The next-generation wireless LAN system (IEEE 802.11be or EHT wireless LAN system) may support a broadband communication to increase throughput. The broadband may include 160 MHz, 240 MHz, and 320 MHz bands (or 160+160 MHz bands). Further, the present example proposes an STF sequence for obtaining an optimal PAPR in consideration of a tone plan for each band, whether preamble puncturing is performed, and RF capability.

The present embodiment may be performed in a transmitting STA, and the transmitting STA may correspond to an access point (AP). The receiving STA of the present embodiment may correspond to an STA supporting an Extremely High Throughput (EHT) WLAN system.

The receiving station (STA) receives the EHT PPDU including a Short Training Field (STF) signal from the transmitting STA through a 320 MHz band or a 160+160 MHz band. The 320 MHz band may be a continuous band, and the 160+160 MHz band may be a discontinuous band.

The receiving STA decodes the EHT PPDU. In addition, the receiving STA may perform automatic gain control (AGC) estimation in multiple input multiple output (MIMO) transmission based on the STF signal.

The STF signal is generated based on the EHT STF sequence for the 320 MHz band or the 160+160 MHz band.

The EHT STF sequence for the 320 MHz band is a first sequence in which a pre-set M sequence is repeated, and is defined as follows.

$\{M \quad -1-M-1M-1M0-M1-M1-M1M0-M1M1-M1-M0M-1M-1M \; -1-M\}*(1+j)/\text{sqrt}(2)$, where sqrt( ) denotes a square root. Further, * denotes a multiplication operator.

The preset M sequence may be defined as follows.

$M=\{-1,-1,-1,1,1,1,-1,1,1,1,-1,1,1,-1,1\}$

The preset M sequence may be the same as the M sequence defined in 801.11ax.

According to the embodiment proposed in the present specification, an example of configuring an EHT PPDU by setting an STF sequence having an optimal PAPR in a broadband tone plan that repeats a tone plan defined in an EHT wireless LAN system is proposed. Through this, it is possible to increase the throughput and improve the overall system.

BRIEF DESCRIPTION OF THE DRAWINGS

FIG. 18 illustrates an example of a PPDU used in the present disclosure.

DESCRIPTION OF EXEMPLARY EMBODIMENTS

Figure 1:
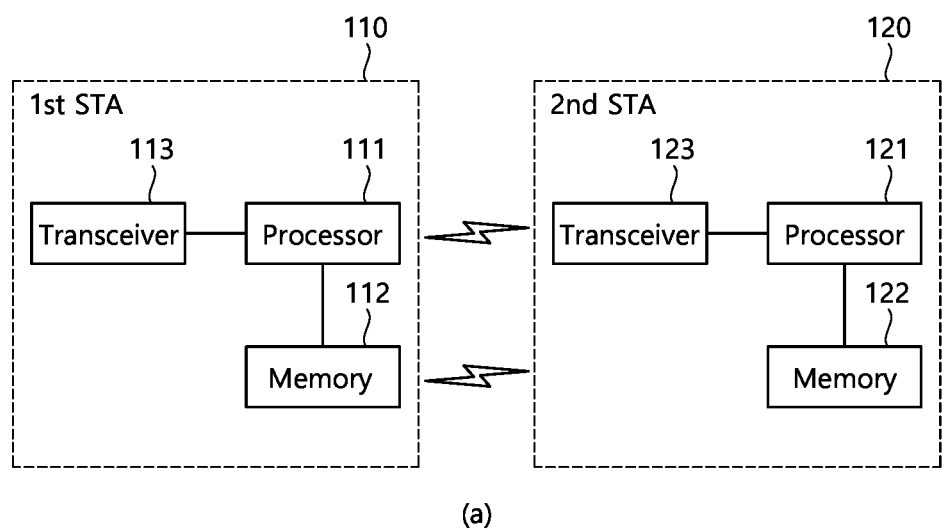
FIG. 1 illustrates an example of a transmitting device and/or a receiving device according to the present disclosure.
Figure 1:
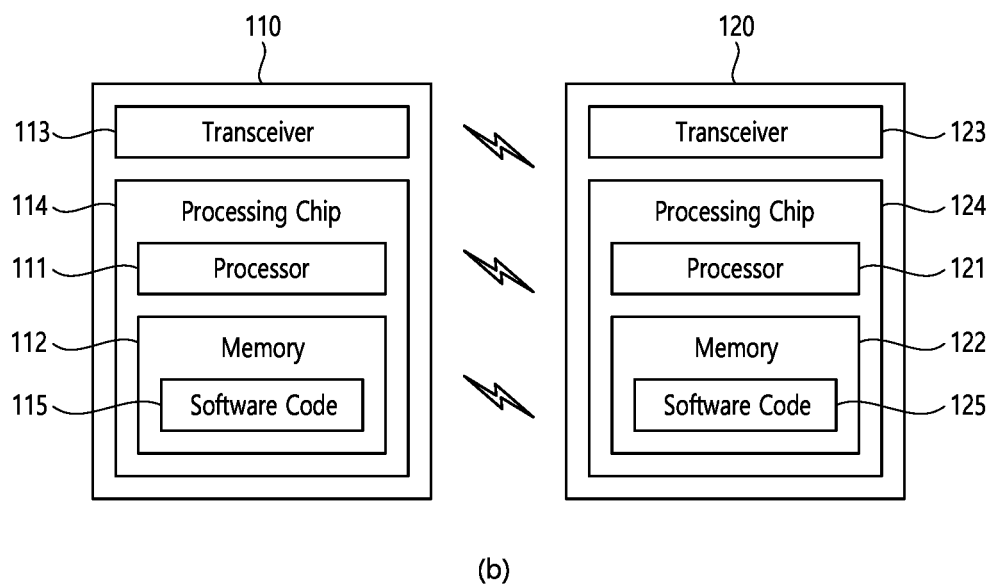

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
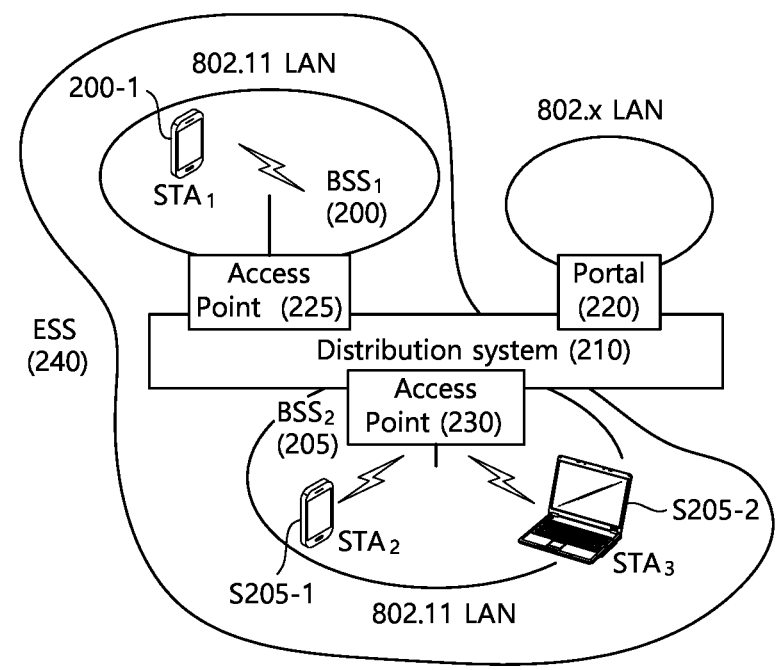
FIG. 2 is a conceptual diagram illustrating the structure of a wireless local area network (WLAN).
Figure 2:
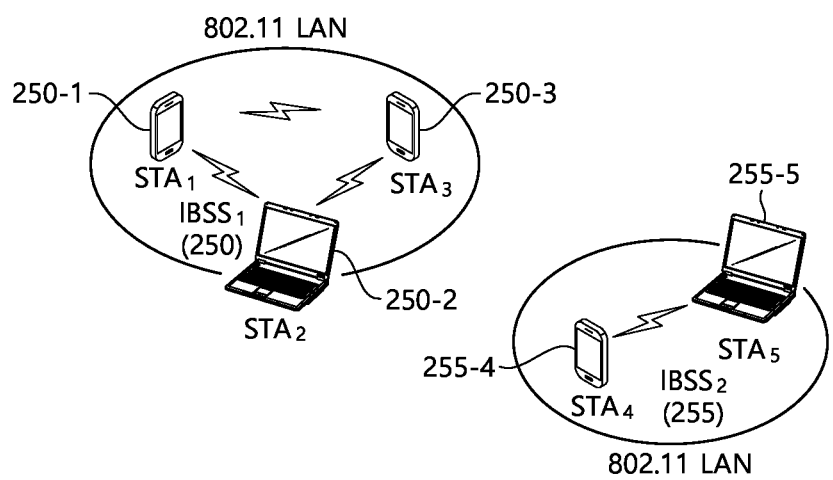

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and an STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
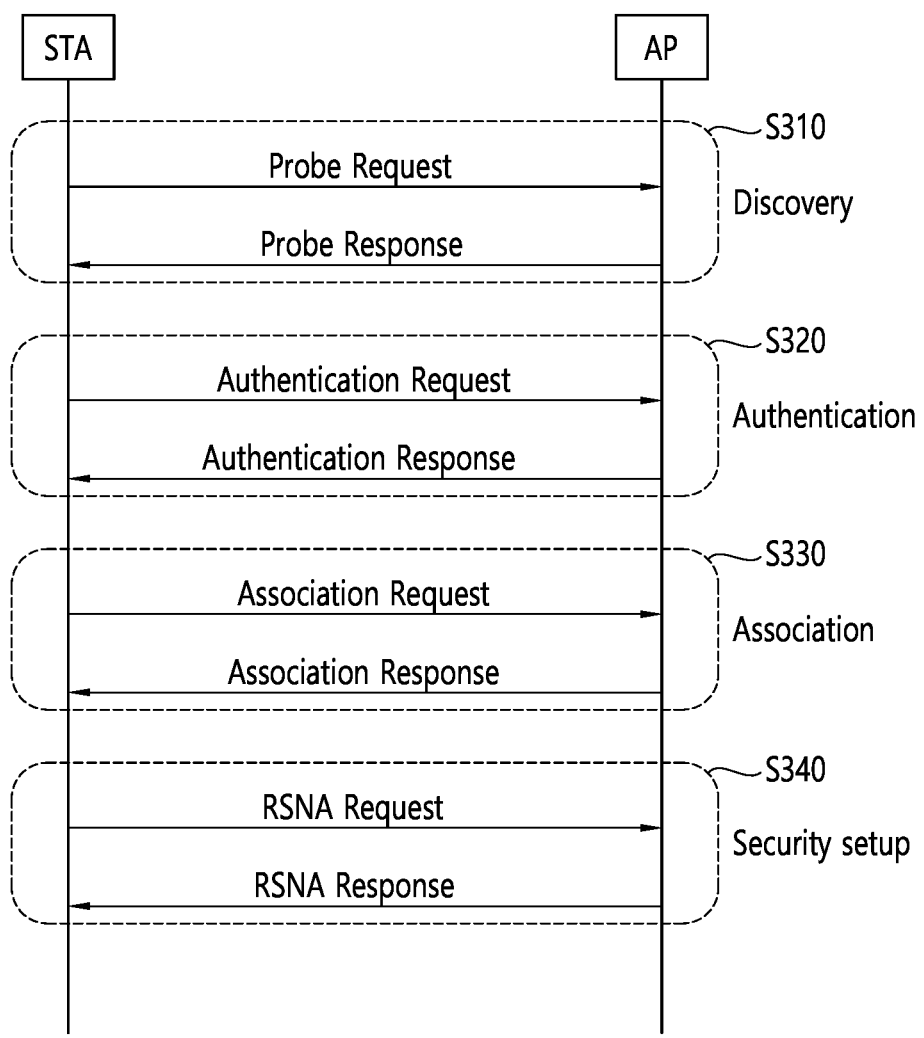
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
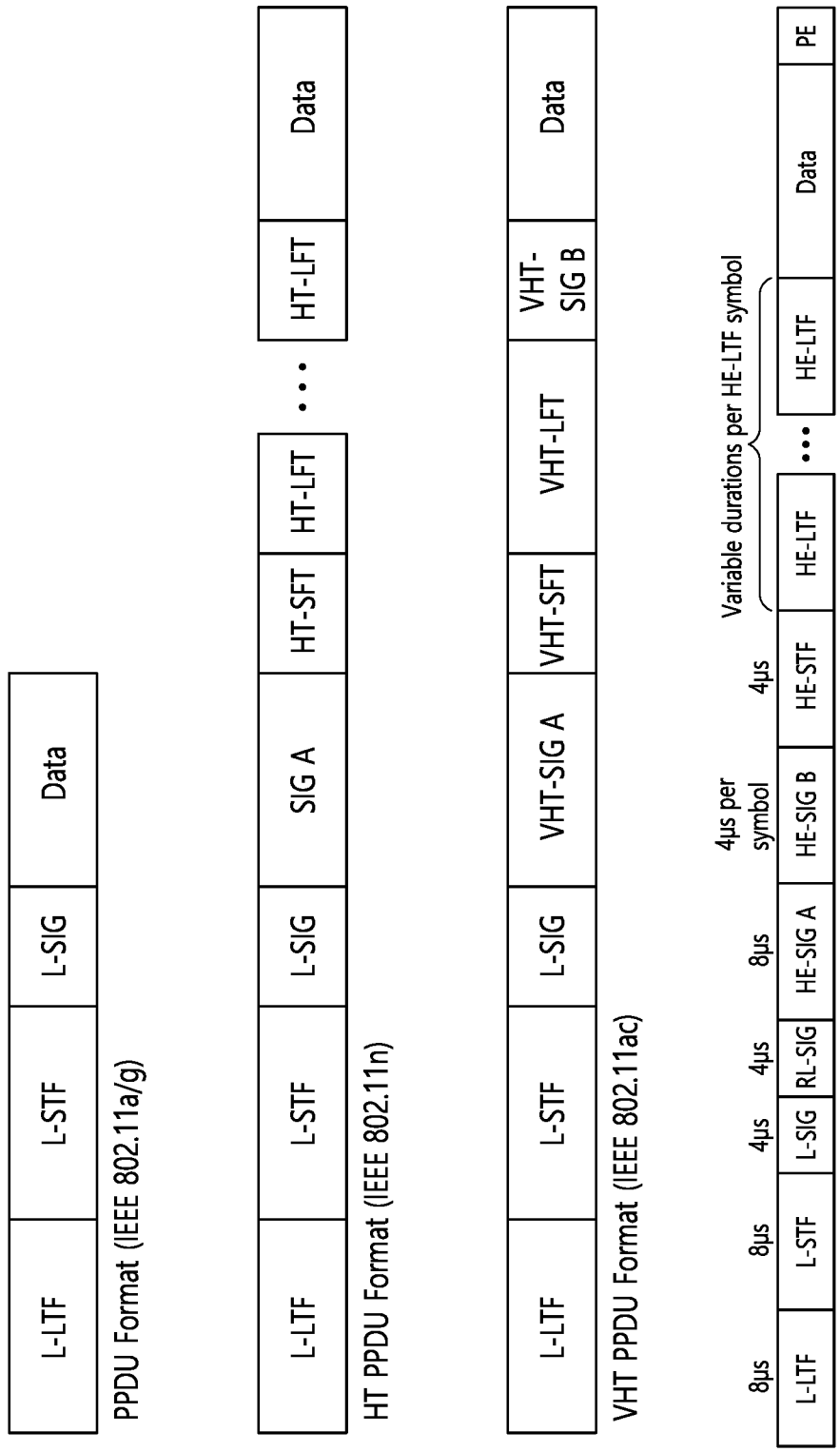
FIG. 4 illustrates an example of a PPDU used in an IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
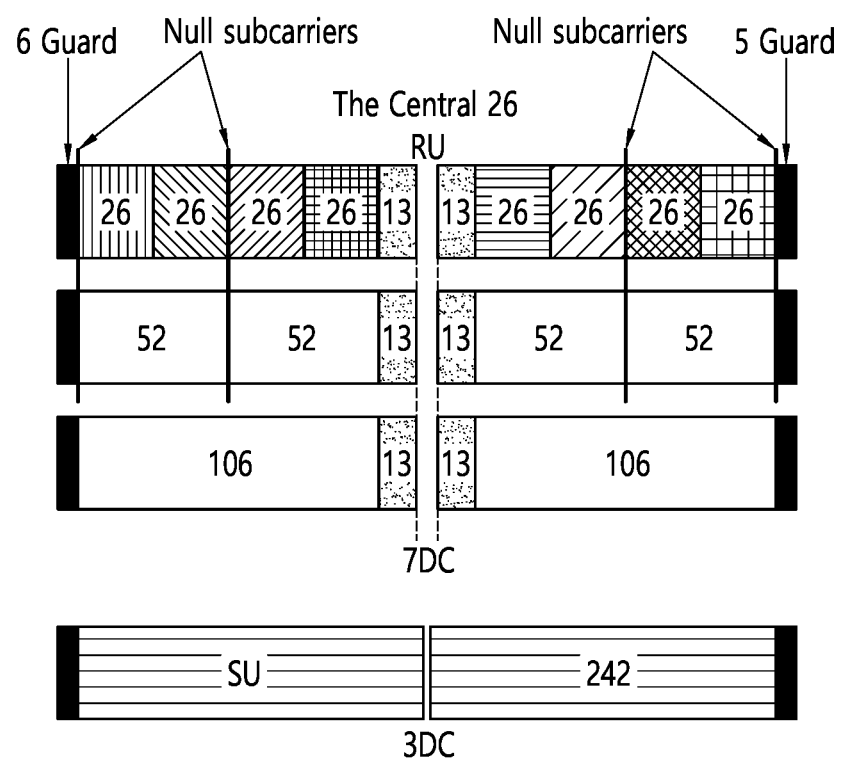
FIG. 5 is a diagram illustrating a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
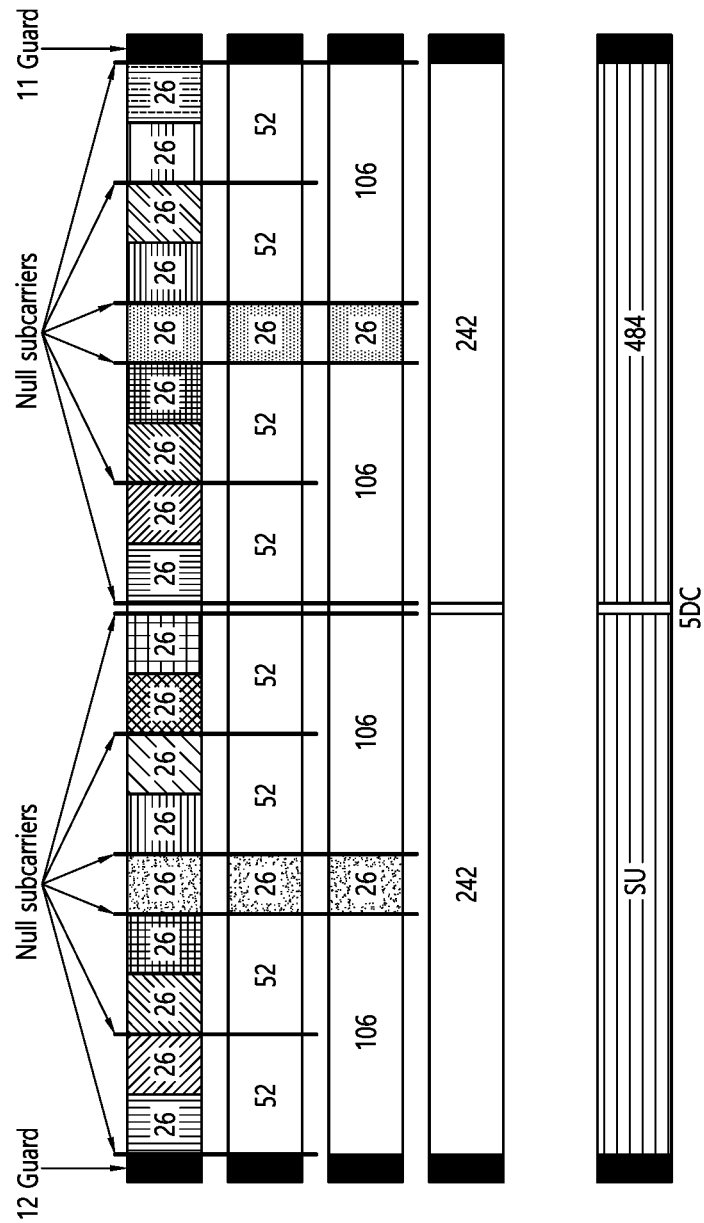
FIG. 6 is a diagram illustrating a layout of resource units (RUs) used in a band of 40 MHz

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
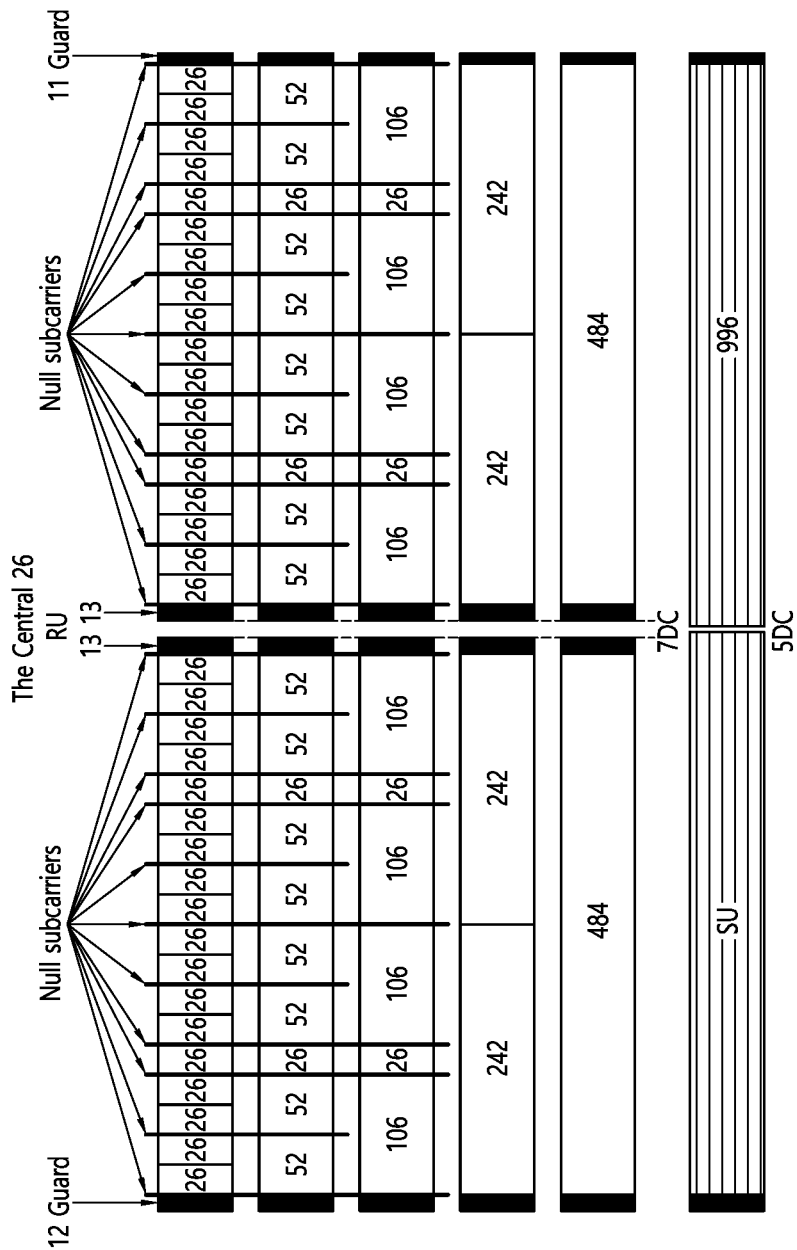
FIG. 7 is a diagram illustrating a layout of resource units (RUs) used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
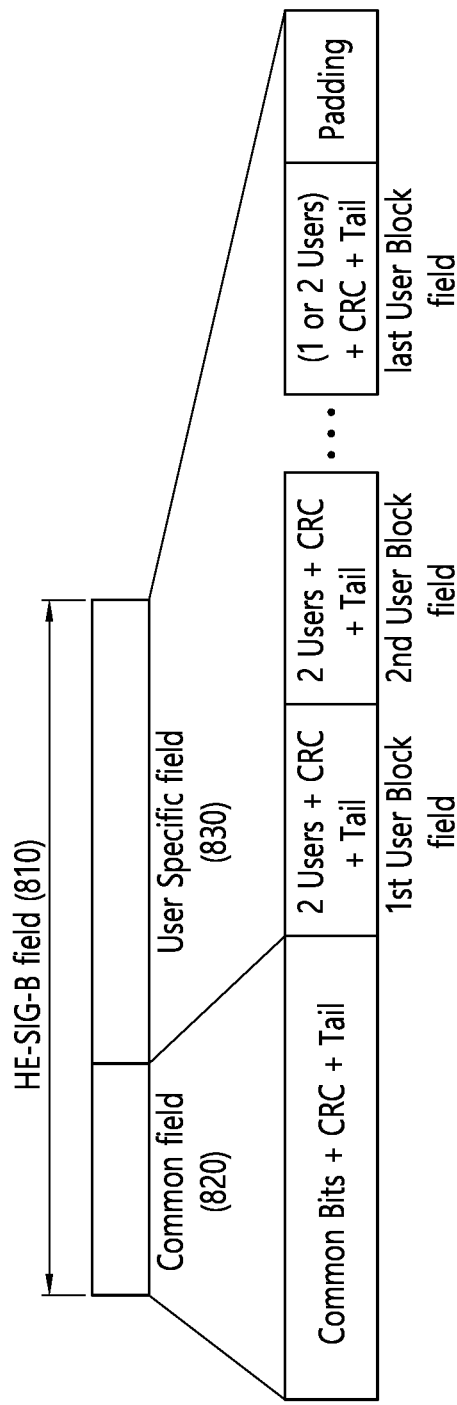
FIG. 8 illustrates the structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |    | 1 |
| 00000010 | 26 | 26 | 26 | 26 | 26 | 52 | 26 | 26 |    | 1 |
| 00000011 | 26 | 26 | 26 | 26 | 26 | 52 | 52 |    |    | 1 |
| 00000100 | 26 | 26 | 52 |    | 26 | 26 | 26 | 26 | 26 | 1 |
| 00000101 | 26 | 26 | 52 |    | 26 | 26 | 26 | 52 |    | 1 |
| 00000110 | 26 | 26 | 52 |    | 26 | 52 | 26 | 26 |    | 1 |
| 00000111 | 26 | 26 | 52 |    | 26 | 52 | 52 |    |    | 1 |
| 00001000 |    | 52 | 26 | 26 | 26 | 26 | 26 | 26 |    | 1 |
| 00001001 |    | 52 | 26 | 26 | 26 | 26 | 26 | 52 |    | 1 |
| 00001010 |    | 52 | 26 | 26 | 26 | 52 | 26 | 26 |    | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| $01000y_2y_1y_0$ |    | 106 |    | 26 | 26 | 26 | 26 | 26 |    | 8 |
| $01001y_2y_1y_0$ |    | 106 |    | 26 | 26 | 26 | 52 |    |    | 8 |

"$01000y2y1y0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
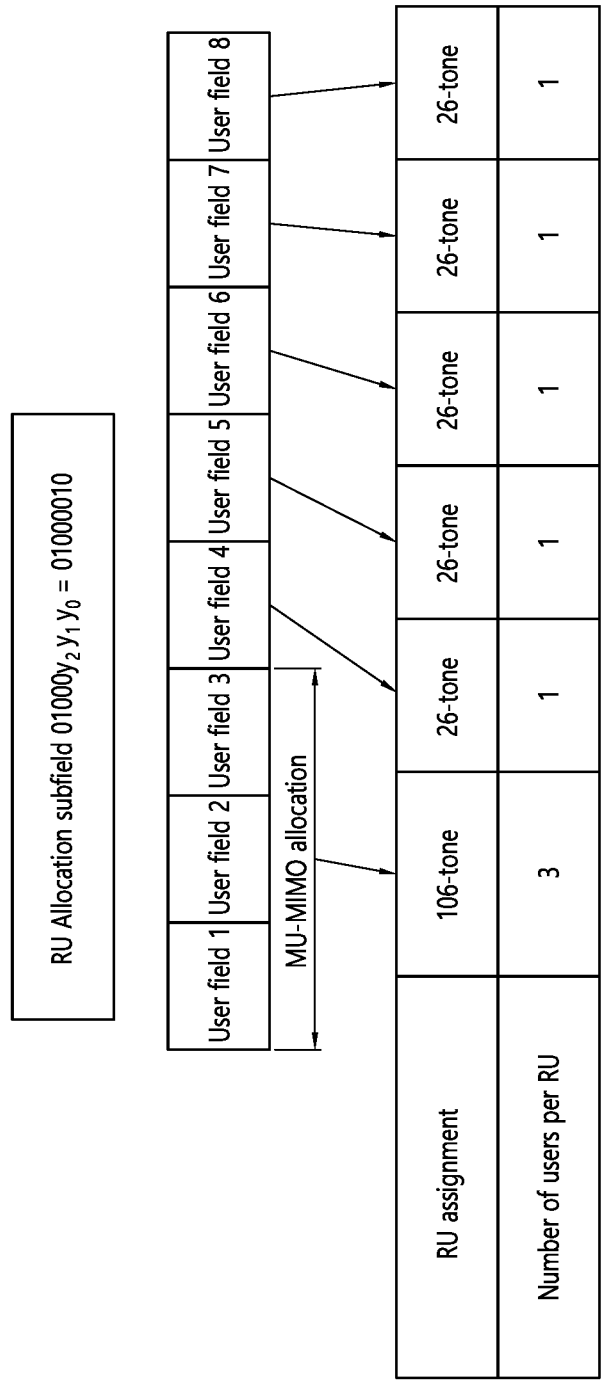
FIG. 9 illustrates an example in which a plurality of user STAs is allocated to the same RU through a MU-MIMO technique.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.).

TABLE 3

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 3 | 2 | 2 | 2 | | | | | 8 | |

TABLE 4

| $N_{user}$ | B3 ... B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N_user is set to "3". Therefore, values of N_STS N_STS[2], and N_STS[3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
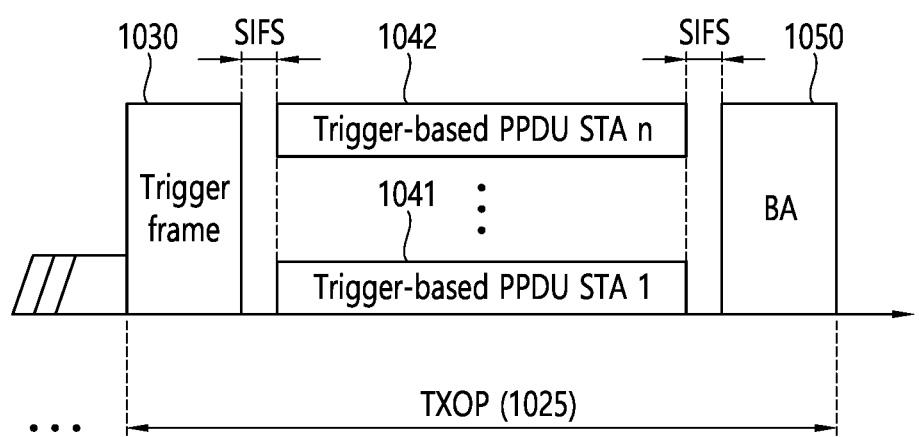
FIG. 10 illustrates a UL-MU operation.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
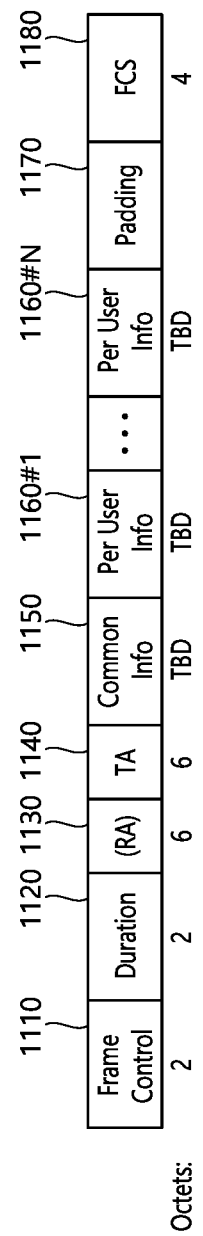
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger PPDU may be included. In addition, as common information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
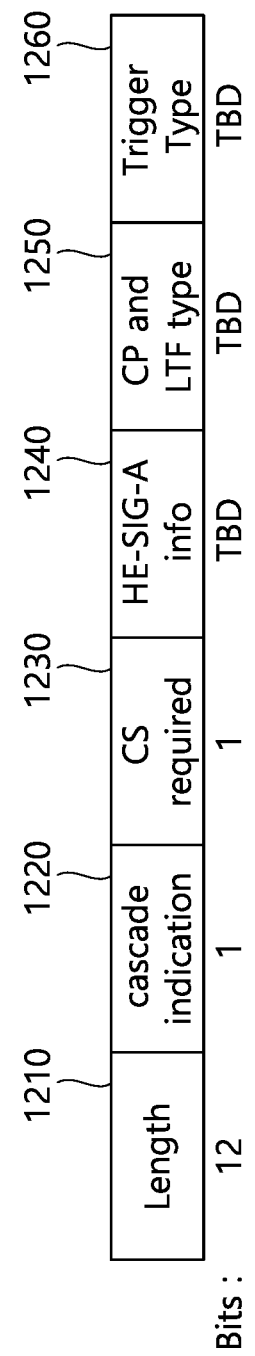
FIG. 12 illustrates an example of a common information field of the trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
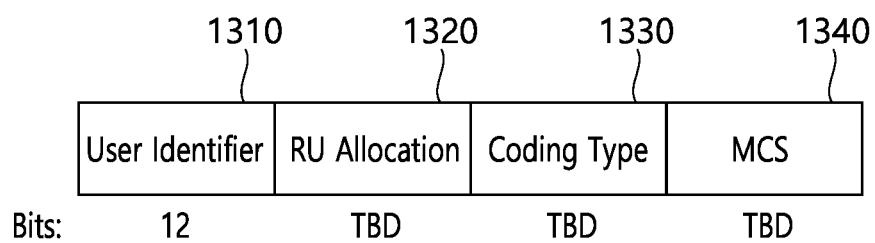
FIG. 13 illustrates an example of a subfield included in a per user information field.

FIG. 13 illustrates an example of a subfield included in a per user information field.

A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL 01-DMA-based random access (UORA) scheme will be described.

Figure 14:
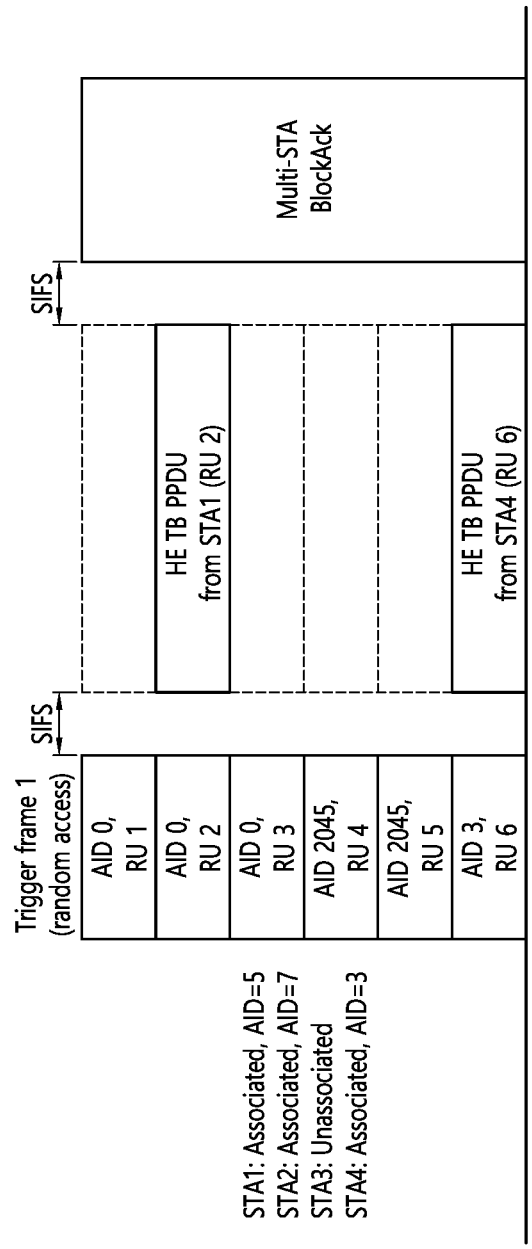
FIG. 14 illustrates technical characteristics of a UROA technique.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
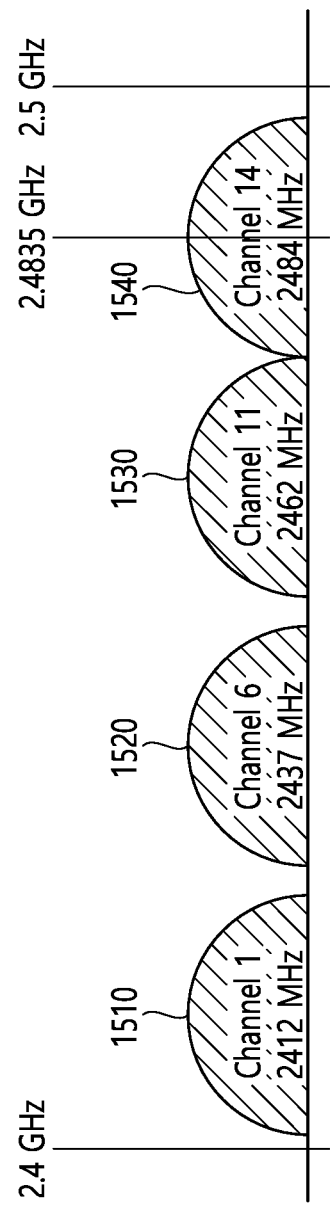
FIG. 15 illustrates an example of a channel used/supported/defined in a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be $(2.407+0.005*N)$ GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462 MHz. The 4th frequency domain 1540 may include a channel 14. In this case, a center frequency of the channel 14 may be set to 2484 MHz.

Figure 16:
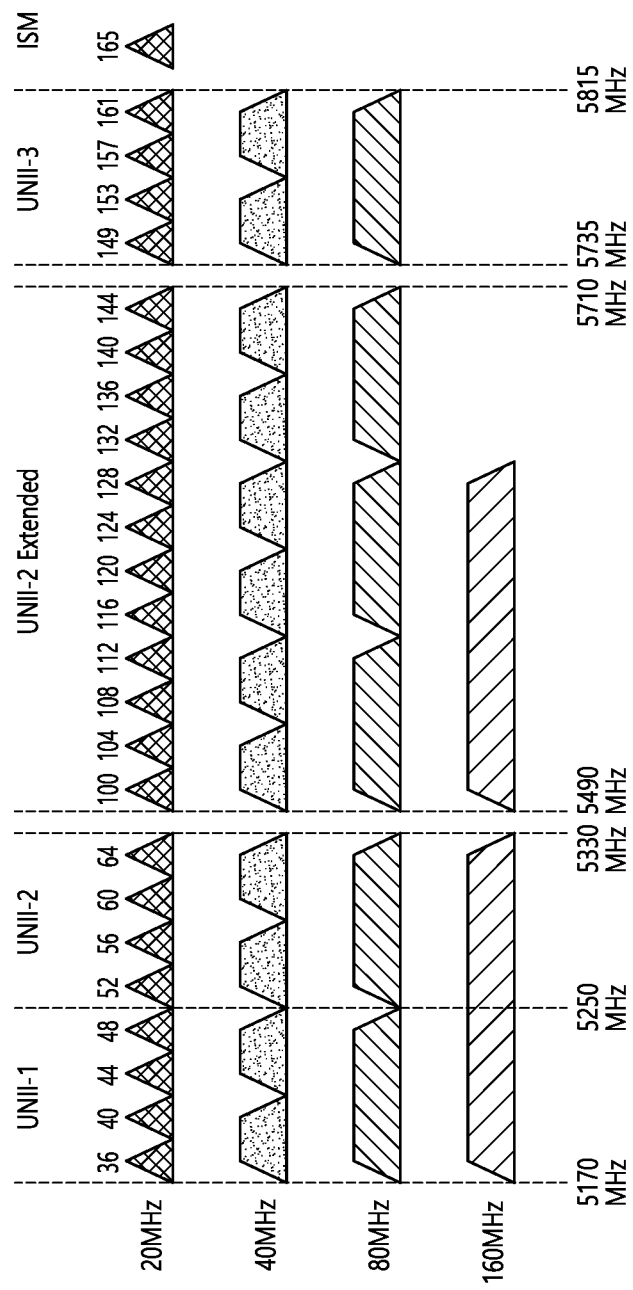
FIG. 16 illustrates an example of a channel used/supported/defined in a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
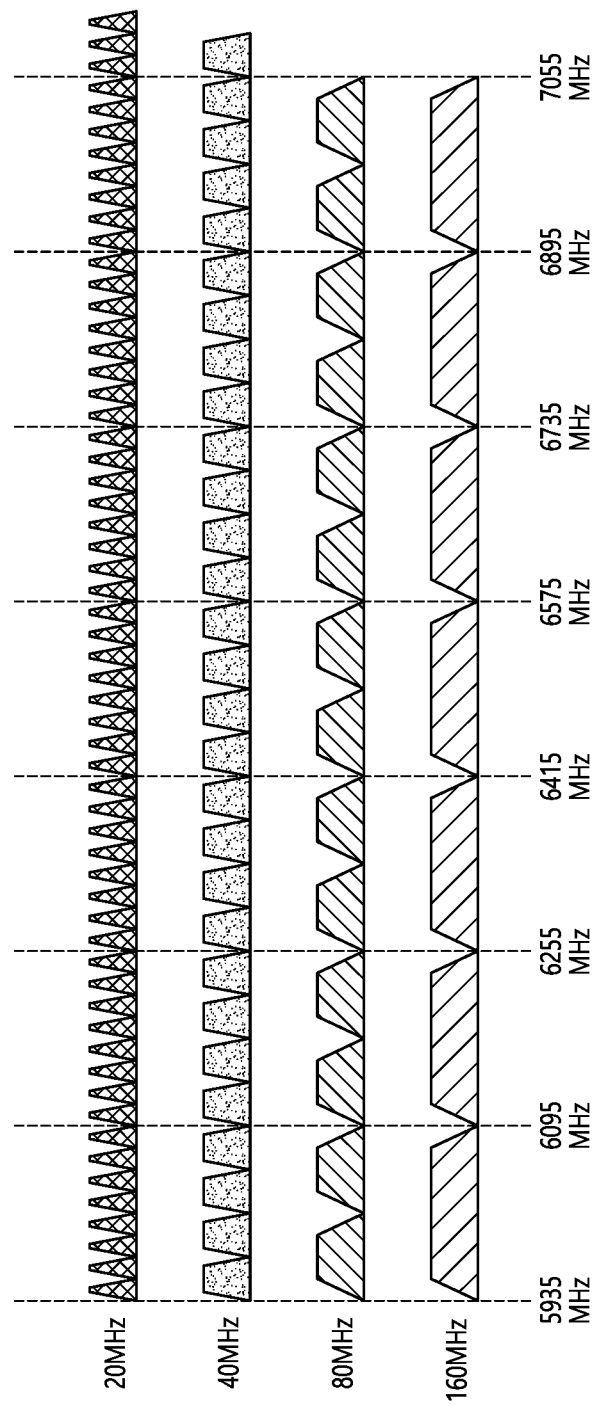
FIG. 17 illustrates an example of a channel used/supported/defined in a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/ supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26-bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1x, 2x, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

1. STF Sequence (or STF Signal)

An HE-STF field mainly aims to improve automatic gain control estimation in MIMO transmission.

Figure 19:
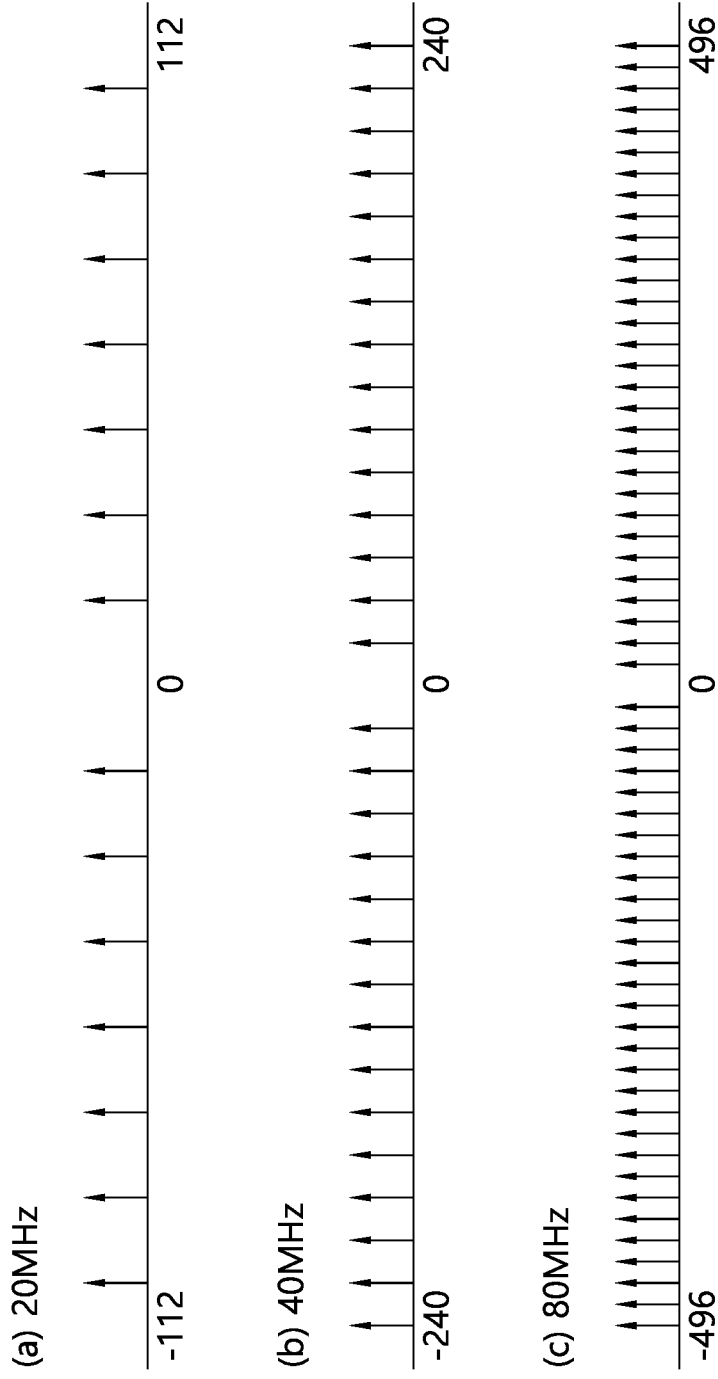
FIG. 19 shows a 1× HE-STF tone in PPDU transmission for each channel according to the present embodiment.

FIG. 19 shows a 1× HE-STF tone in PPDU transmission for each channel according to the present embodiment. More specifically, an HE-STF tone (i.e., 16-tone sampling) having a periodicity of 0.8 μs in a 20 MHz/40 MHz/80 MHz bandwidth is shown for example in FIG. 19. Therefore, in FIG. 19, HE-STF tones for respective bandwidths (or channels) may be located with an interval of 16 tones.

In FIG. 19, an x-axis represents a frequency domain. A numerical value on the x-axis indicates a tone index, and an arrow indicates that a non-zero value is mapped to the tone index.

A sub-figure (a) of FIG. 19 shows an example of a 1× HE-STF tone in 20 MHz PPDU transmission.

Referring to the sub-figure (a), when an HE-STF sequence (i.e., 1× HE-STF sequence) for a periodicity of 0.8 μs is mapped to tones of a 20 MHz channel, the 1× HE-STF sequence may be mapped to a tone having a tone index which is a multiple of 16, except for DC, among tones having a tone index from −112 to 112, and 0 may be mapped to the remaining tones. That is, in the 20 MHz channel, the 1× HE-STF tone may be located at a tone index which is a multiple of 16, except for DC, among the tones having the tone index from −112 to 112. Therefore, the total number of 1× HE-STF tones to which the 1× HE-STF sequence is mapped may be 14 in the 20 MHz channel.

A sub-figure (b) shows an example of a 1× HE-STF tone in 40 MHz PPDU transmission.

Referring to the sub-figure (b), when an HE-STF sequence (i.e., 1× HE-STF sequence) for a periodicity of 0.8 μs is mapped to tones of a 40 MHz channel, the 1× HE-STF sequence may be mapped to a tone having a tone index which is a multiple of 16, except for DC, among tones having a tone index from −240 to 240, and 0 may be mapped to the remaining tones. That is, in the 40 MHz channel, the 1× HE-STF tone may be located at a tone index which is a multiple of 16, except for DC, among the tones having the tone index from −240 to 240. Therefore, the total number of 1× HE-STF tones to which the 1× HE-STF sequence is mapped may be 30 in the 40 MHz channel.

A sub-figure (c) shows an example of a 1× HE-STF tone in 80 MHz PPDU transmission.

Referring to the sub-figure (c), when an HE-STF sequence (i.e., 1× HE-STF sequence) for a periodicity of 0.8 μs is mapped to tones of an 80 MHz channel, the 1× HE-STF sequence may be mapped to a tone having a tone index which is a multiple of 16, except for DC, among tones having a tone index from −496 to 496, and 0 may be mapped to the remaining tones. That is, in the 80 MHz channel, the 1× HE-STF tone may be located at a tone index which is a multiple of 16, except for DC, among the tones having the tone index from −496 to 496. Therefore, the total number of 1× HE-STF tones to which the 1× HE-STF sequence is mapped may be 62 in the 80 MHz channel.

Figure 20:
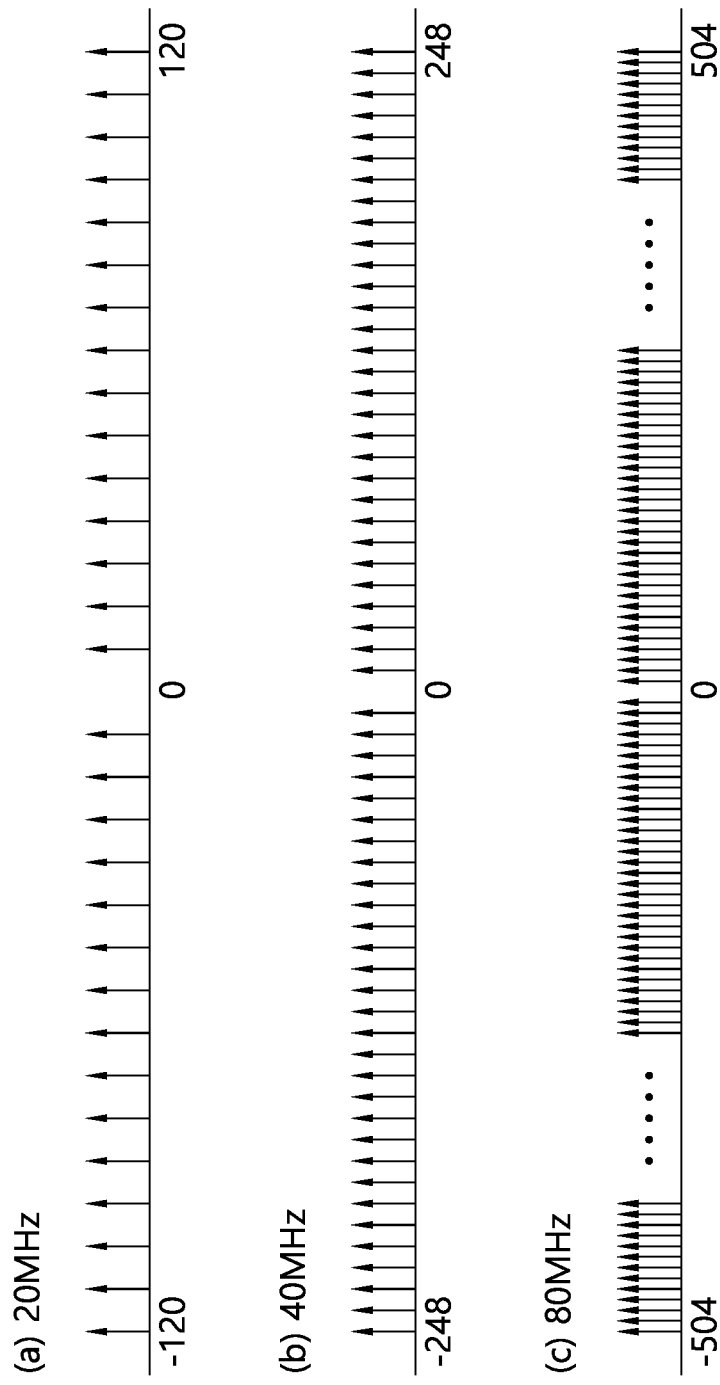
FIG. 20 shows a 2× HE-STF tone in PPDU transmission for each channel according to the present embodiment.

FIG. 20 shows a 2× HE-STF tone in PPDU transmission for each channel according to the present embodiment. More specifically, an HE-STF tone (i.e., 8-tone sampling) having a periodicity of 1.6 μs in a 20 MHz/40 MHz/80 MHz bandwidth is shown for example in FIG. 20. Therefore, in FIG. 20, HE-STF tones for respective bandwidths (or channels) may be located with an interval of 8 tones.

The 2× HE-STF signal according to FIG. 20 may be applied to an uplink MU PPDU. That is, the 2× HE-STF signal shown in FIG. 20 may be included in a PPDU transmitted through uplink in response to the aforementioned trigger frame.

In FIG. 20, an x-axis represents a frequency domain. A numerical value on the x-axis indicates a tone index, and an arrow indicates that a non-zero value is mapped to the tone index.

A sub-figure (a) of FIG. 20 shows an example of a 2× HE-STF tone in 20 MHz PPDU transmission.

Referring to the sub-figure (a), when an HE-STF sequence (i.e., 2× HE-STF sequence) for a periodicity of 1.6 μs is mapped to tones of a 20 MHz channel, the 2× HE-STF sequence may be mapped to a tone having a tone index which is a multiple of 8, except for DC, among tones having a tone index from −120 to 120, and 0 may be mapped to the remaining tones. That is, in the 20 MHz channel, the 2× HE-STF tone may be located at a tone index which is a multiple of 8, except for DC, among the tones having the tone index from −120 to 120. Therefore, the total number of 2× HE-STF tones to which the 2× HE-STF sequence is mapped may be 30 in the 20 MHz channel.

A sub-figure (b) shows an example of a 2× HE-STF tone in 40 MHz PPDU transmission.

Referring to the sub-figure (b), when an HE-STF sequence (i.e., 2× HE-STF sequence) for a periodicity of 1.6 μs is mapped to tones of a 40 MHz channel, the 2× HE-STF sequence may be mapped to a tone having a tone index which is a multiple of 8, except for DC, among tones having a tone index from −248 to 248, and 0 may be mapped to the remaining tones. That is, in the 40 MHz channel, the 2×HE-STF tone may be located at a tone index which is a multiple of 8, except for DC, among the tones having the tone index from −248 to 248. Herein, however, tones having the tone index of ±248 correspond to guard tones (left and right guard tones), and may be nulled (i.e., may have a zero value). Therefore, the total number of 2× HE-STF tones to which the 2× HE-STF sequence is mapped may be 60 in the 40 MHz channel A sub-figure (c) shows an example of a 2× HE-STF tone in 80 MHz PPDU transmission.

Referring to the sub-figure (c), when an HE-STF sequence (i.e., 2× HE-STF sequence) for a periodicity of 1.6 μs is mapped to tones of an 80 MHz channel, the 2× HE-STF sequence may be mapped to a tone having a tone index which is a multiple of 8, except for DC, among tones having a tone index from −504 to 504, and 0 may be mapped to the remaining tones. That is, in the 80 MHz channel, the 2× HE-STF tone may be located at a tone index which is a multiple of 8, except for DC, among the tones having the tone index from −504 to 504. Herein, however, tones having the tone index of ±504 correspond to guard tones (left and right guard tones), and may be nulled (i.e., may have a zero value). Therefore, the total number of 2× HE-STF tones to which the 2× HE-STF sequence is mapped may be 124 in the 80 MHz channel.

The 1× HE-STF of FIG. 19 may be used to configure an HE-STF field not for the HE TB PPDU but for the HE PPDU. The 2× HE-STF sequence of FIG. 20 may be used to configure an HE-STF field for the HE TB PPDU.

Hereinafter, a sequence applicable to a 1× HE-STF tone (i.e., sampling with an interval of 16 tones) and a sequence applicable to a 2× HE-STF tones (i.e., sampling with an interval of 8 tones) are proposed. Specifically, a sequence structure with excellent scalability is proposed by using a nested structure in which a basic sequence is set and the basic sequence is included as part of a new sequence. An M-sequence used in the following example is preferably a sequence having a length of 15. The M-sequence is preferably configured of a binary sequence to reduce the complexity during decoding.

First, the M-sequence used to configure the HE-STF field is defined as follows.

M={−1, −1, −1, 1, 1, 1, −1, 1, 1, 1, −1, 1, 1, −1, 1}

The HE-STF field may be configured by mapping each 242-tone RU to the M sequence multiplied by (1+j)/sqrt(2) or (−1−j)/sqrt(2). For a transmission bandwidth greater than 40 MHz, (1+j)/sqrt(2) or (−1−j)/sqrt(2) may be assigned to a subcarrier index in a center 26-tone RU.

For 20 MHz/40 MHz/80 MHz/160 MHz/80+80 MHz transmission, a frequency domain sequence for an HE PPDU, not an HE TB PPDU, is given as follows.

For a 20 MHz transmission, the frequency domain sequence for HE PPDUs that are not HE TB PPDUs is given by Equation (27-23).

$$HES_{-112:16:112} = \{M\} \cdot (1+j)/\sqrt{4} \quad (27\text{-}23)$$

The value of the HE-STF sequence at null tone index 0 is $HES_0 = 0$ where $HES_{a:b:c}$ means coefficients of the HE-STF on every b subcarrier indices from a to c subcarrier indices and coefficients on other subcarrier indices are set to zero.

For a 40 MHz transmission, the frequency domain sequence for HE PPDUs that are not HE TB PPDUs is given by Equation (27-24).

$$HES_{-240:16:240} = \{M, 0, M\} \cdot (1+j)/\sqrt{2} \quad (27\text{-}24)$$

For an 80 MHz transmission, the frequency domain sequence for HE PPDUs that are not HE TB PPDUs is given by Equation (27-25).

$$HES_{-496:16:496} = \{M, 1, -M, 0, -M, 1, -M\} \cdot (1+j)/\sqrt{2} \quad (27\text{-}25)$$

For a 160 MHz transmission, the frequency domain sequence for HE PPDUs that are not HE TB PPDUs is given by Equation (27-26).

$$HES_{-1008:16:1008} = \{M, 1, -M, 0, -M, 1, -M, 0, -M, 1, M, 0, -M, 1, -M\} \cdot (1+j)/\sqrt{2} \quad (27\text{-}26)$$

For an 80+80 MHz transmission, the lower 80 MHz segment for HE PPDUs that are not HE TB PPDUs shall use the HE-STF pattern for the 80 MHz defined in Equation (27-25).

For an 80+80 MHz transmission, the frequency domain sequence of the upper 80 MHz segment for HE PPDUs that are not HE TB PPDUs is given by Equation (27-27).

$$HES_{-496:6496} = \{-M, -1, M, 0, -M, 1, -M\ 1\} \cdot (1+j)/\sqrt{2} \quad (27\text{-}27)$$

For 20 MHz/40 MHz/80 MHz/160 MHz/80+80 MHz transmission, a frequency domain sequence for an HE TB PPDU and an HE TB feedback null data packet (NDP) is given as follows.

For a 20 MHz transmission, the frequency domain sequence for HE TB PPDUs is given by Equation (27-28).

$$HES_{-120:8:120} = \{M, 0, -M\} \cdot (1+j)/\sqrt{2} \quad (27\text{-}28)$$

For an HE TB feedback NDP in 20 MHz channel width, the frequency domain sequence is given by Equation (27-29).

$$HES_{-120:8:120}^{TB\ NDP} = HES\_120{:}8{:}120 \quad (27\text{-}29)$$

For a 40 MHz transmission, the frequency domain sequence for HE TB PPDUs is given by Equation (27-30).

$$HES_{-248:8:248} = \{M, -1, -M, 0, M, -1, M\} \cdot (1+j)/\sqrt{2} \quad (27\text{-}30)$$

The value of the HE-STF sequence at edge tone indices ±248 is $HES_{\pm 248} = 0$ For an HE TB feedback NDP in 40 MHz channel width, the frequency domain sequence is given by Equation (27-31).

$$HES_{-248:8:-8}^{TB\ NDP} = \{M, -1, -M\} \cdot (1+j)/\sqrt{2}, \text{ if } RU\_TONE\_SET\_INDEX \le 18$$

$$HES_{8:8:248}^{TB\ NDP} = \{M, -1, M\} \cdot (1+j)/\sqrt{2}, \text{ if } RU\_TONE\_SET\_INDEX > 18$$

$$HES_{\pm 248}^{TB\ NDP} = 0 \quad (27\text{-}31)$$

For an 80 MHz transmission, the frequency domain sequence for HE TB PPDUs is given by Equation (27-32).

$$HES_{-504:8:504} = \{M, -1, M, -1, -M, -1, M, 0, -M, 1, M, 1, -M, 1, -M\} \cdot (1+j)/\sqrt{2} \quad (27\text{-}32)$$

The value of the HE-STF sequence at edge tone indices ±504 is $HES_{\pm 504} = 0$ For an HE TB feedback NDP in 80 MHz channel width, the frequency domain sequence is given by Equation (27-33).

$$HES_{-504:8:-264}^{TB\ NDP} = \{M, -1, M\} \cdot (1+j)/\sqrt{2}, \text{ if } RU\_TONE\_SET\_INDEX \le 18$$

$$HES_{-248:8:-8}^{TB\ NDP} = \{-M, -1, M\} \cdot (1+j)/\sqrt{2}, \text{ if } 18 < RU\_TONE\_SET\_INDEX \le 36$$

$$HES_{-8:8:248}^{TB\ NDP} = \{-M, 1, M\} \cdot (1+j)/\sqrt{2}, \text{ if } 36 < RU\_TONE\_SET\_INDEX \le 54$$

$$HES_{-264:8:504}^{TB\ NDP} = \{-M, 1, -M\} \cdot (1+j)/\sqrt{2}, \text{ if } 54 < RU\_TONE\_SET\_INDEX \le 72$$

$$HES_{\pm 504}^{TB\ NDP} = 0 \quad (27\text{-}33)$$

For a 160 MHz transmission, the frequency domain sequence for HE TB PPDUs is given by Equation (27-34).

$$HES_{-1016:8:1016} = \{M, -1, M, -1, -M, -1, M, 0, -M, 1, M, 1, -M, 1, -M, 0, -M, 1, M, 1, -M, 1, M, 1, -M, 1, -M\} \cdot (1+j)/\sqrt{2} \quad (27\text{-}34)$$

The value of the HE-STF sequence at edge tone indices ±8 and ±1016 is $HES_{\pm 8} = 0$, $HES_{\pm 1016} = 0$ For an HE TB feedback NDP in 160 MHz channel width, the frequency domain sequence is given by Equation (27-35).

$$HES_{-1016:8:-776}^{TB\ NDP} = \{M, -1, M\} \cdot (1+j)/\sqrt{2}, \text{ if } RU\_TONE\_SET\_INDEX \le 18$$

$$HES_{-760:8:-520}^{TB\ NDP} = \{-M, -1, M\} \cdot (1+j)/\sqrt{2}, \text{ if } 18 < RU\_TONE\_SET\_INDEX \le 36$$

$$HES_{-504:8:-264}^{TB\ NDP} = \{-M, 1, M\} \cdot (1+j)/\sqrt{2}, \text{ if } 36 < RU\_TONE\_SET\_INDEX \le 54$$

$$HES_{-248:8:-8}^{TB\ NDP} = \{-M, 1, -M\} \cdot (1+j)/\sqrt{2}, \text{ if } 54 < RU\_TONE\_SET\_INDEX \le 72$$

$$HES_{8:8:248}^{TB\ NDP} = \{-M, 1, -M\} \cdot (1+j)/\sqrt{2}, \text{ if } 72 < RU\_TONE\_SET\_INDEX \le 90$$

$$HES_{264:8:504}^{TB\ NDP} = \{M, 1, -M\} \cdot (1+j)/\sqrt{2}, \text{ if } 90 < RU\_TONE\_SET\_INDEX \le 108$$

$$HES_{520:8:760}^{TB\ NDP} = \{-M, 1, M\} \cdot (1+j)/\sqrt{2}, \text{ if } 108 < RU\_TONE\_SET\_INDEX \le 126$$

$$HES_{776:8:1016}^{TB\ NDP} = \{-M, 1, -M\} \cdot (1+j)/\sqrt{2}, \text{ if } 126 < RU\_TONE\_SET\_INDEX \le 144$$

$$HES_{\pm 8}^{TB\ NDP} = HES_{\pm 1016}^{TB\ NDP} = 0$$

For an 80+80 MHz transmission, the lower 80 MHz segment for HE TB PPDUs shall use the HE-STF pattern for the 80 MHz defined in Equation (27-32).

For an 80+80 MHz transmission, the frequency domain sequence of the upper 80 MHz segment for HE TB PPDUs is given by Equation (27-36).

$$HES_{-504:8:504} = \{-M, 1, -M, 1, M, 1, -M, 0, -M, 1, M, 1, -M, 1, -M\} \cdot (1+j)/\sqrt{2} \quad (27\text{-}36)$$

The value of the HE-STF sequence at edge tone indices ±504 is $HES_{\pm 504} = 0$ For an HE TB feedback NDP in the lower 80 MHz segment of an 80+80 MHz channel width, the frequency domain sequence is given by Equation (27-33).

For an HE TB feedback NDP in the upper 80 MHz segment of an 80+80 MHz channel width, the frequency domain sequence is given by Equation (27-37).

$HES_{-504:8:-264}{}^{TB\ NDP}=\{-M,1,-M\}\cdot(1+j)/\sqrt{2}$, if RU_TONE_SET_INDEX≤90

$HES_{-248:8:-8}{}^{TB\ NDP}=\{M,1,-M\}\cdot(1+j)/\sqrt{2}$, if 90<RU_TONE_SET_INDEX≤108

$HES_{8:8:248}{}^{TB\ NDP}=\{-M,1,M\}\cdot(1+j)/\sqrt{2}$, if 108<RU_TONE_SET_INDEX≤126

$HES_{264:8:504}{}^{TB\ NDP}=\{-M,1,-M\}\cdot(1+j)/\sqrt{2}$, if 126<RU_TONE_SET_INDEX≤144

$HES_{\pm 504}{}^{TB\ NDP}=0$ \hfill (27-37)

2. Proposal of Tone Plan in EHT WLAN System

In the existing 11ax, a tone plan for full band and OFDMA transmission at 20/40/80/80+80/160 MHz is designed, and a 160 MHz tone plan is used by simply repeating the existing 80 MHz tone plan twice. This is designed in consideration of a case where transmission is performed by taking two RFs into account, and may be a reasonable tone plan in case of non-contiguous 80+80 MHz. However, a situation where transmission is performed by using one RF may be considered in case of contiguous 160 MHz. In this case, since there are many subcarriers wasted in the existing tone plan, a new tone plan may be proposed to increase efficiency and throughput of a subcarrier in use.

2.1. New 160 MHz Tone Plan

<Full Band>

In case of transmission using a full band, a new resource unit (RU) may be proposed, and a size of the new RU may be determined by considering various DC tones according to an effect of a DC offset and by considering the existing 11ax 160 MHz guard tone. The existing 11ax guard tone consists of left 12 tones and right 11 tones, and the number of DC tones of 80 MHz is 5 or 7. When this is directly considered, the new RU of the full band is 2020RU or 2018RU.

12/11 guard tone, 5DC, 2020RU

12/11 guard tone, 7DC, 2018RU

In 160 MHz, considering the effect of the DC offset, it is not preferable that the number of DC tones in use is less than 5/7 which is less than the number of DC tones used in the existing 80 MHz. In addition, 5/7DC may be sufficient in terms of performance. Considering the following OFDMA tone plan, up to 7DC may be suitable. In the following OFDMA tone plan, DC is designed by considering 7DC and 5DC in the existing 80 MHz OFDMA tone plan, and it is not preferable that the number of DC tones is less than that. 5 or 7DC may be sufficient in terms of performance. 7DC is used in 20 MHz and 80 MHz which is a case where a center 26RU (13+13RU) is used in the existing flax.

<OFDMA Tone Plan>

The OFDMA tone plan can be expressed using the existing 996RU and 26RU (13+13RU) as follows. Hereinafter, G denotes a guard tone and N denotes a null tone.

12G+996RU+13RU+7DC+13RU+996RU+11G

12G+996RU+1N+13RU+5DC+13RU+1N+996RU+11G

The number of DC tones and the number of null subcarriers at both sides may be determined by a DC offset of the center 26RU (13+13 RU) and performance based on an effect of interference. Considering the effect of interference, it may be preferably configured of 5DC and 1 null carrier at both sides.

The following two configurations are proposed as a 996RU configuration.

996RU=484RU+1N+26RU+1N+484RU

996RU=1N+484RU+26RU+484RU+1N

In a first configuration, a null tone is present at both sides of the 26RU so that an effect of interference from/to an adjacent RU can be decreased. In a second configuration, the effect of interference between 484RU and its adjacent RU can be decreased. An RU which uses a small number of subcarriers, such as 26RU, may preferably use the first configuration since interference has significant effect on performance.

The 484RU is configured of two 242RUs as in the existing flax.

484RU=242RU+242RU

The 242RU has the following configuration as in the existing 11ax.

242RU=1N+106RU+1N+26RU+1N+106RU+1N

The 106RU has the following configuration as in the existing 11ax.

106RU=52RU+2N+52RU

The 52RU has the following configuration as in the existing 11ax.

52RU=26RU+26RU 2.2. Tone Plan of 40 MHz

An AP may transmit a PPDU by using a bandwidth of 240 MHz which may be configured by combining three existing 11ax 80 MHz tone plans. This may be expressed as follows by considering both contiguous and non-contiguous situations. 80+80+80 MHz/160+80 MHz/80+160 MHz/240 MHz + means non-contiguous, and 160/240 means that ⅔ 80 MHz tone plans are contiguously arranged in succession.

<In the Presence of Contiguous Band>

When 160 MHz is used, a tone index of a left 80 MHz tone plan is a tone Index-512 of the existing 80 MHz tone plan, and a tone index of a right 80 MHz tone plan is a tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is a tone index-1024 of the existing 80 MHz tone plan, and a tone index of the right most 80 MHz is a tone index+1024 of the existing 80 MHz tone plan.

A pilot subcarrier shall also be corrected according to a location. When 160 MHz is used, a pilot tone index of a left 80 MHz tone plan is a pilot tone index-512 of the existing 80 MHz tone plan, and a pilot tone index of a right 80 MHz tone plan is a tone index+512 of the existing 80 MHz tone plan.

When 240 MHz is used, a pilot tone index of a center 80 MHz tone plan is directly a pilot tone index of the existing 80 MHz tone plan, a pilot tone index of the leftmost 80 MHz tone plan is a pilot tone index-1024 of the existing 80 MHz tone plan, and a pilot tone index of the right most 80 MHz is a pilot tone index+1024 of the existing 80 MHz tone plan.

Alternatively, the existing 11ax 80 MHz tone plan and the new 160 MHz tone plan may be used, and it may be expressed as follows by considering both contiguous and non-contiguous situations.

c80+n160 MHz/n160 MHz+c80/nc240 MHz/cn240 MHz

+ means non-contiguous, and c80 MHz and n160 MHz respectively mean the existing 11ax 80 MHz tone plan and the new 160 MHz tone plan. nc240 MHz/cn240 MHz mean contiguous one new 160 MHz tone plan and existing one 11 ax 80 MHz tone plan, and nc/cn denote successive orders of the respective tone plans.

When nc240 MHz is used, a tone index of a left 160 MHz tone plan is a tone index-512 of the new 160 MHz tone plan, and a tone index of a right 80 MHz tone plan is a tone index+1024 of the existing 80 MHz tone plan.

When cn240 MHz is used, a tone index of a left 80 MHz tone plan is a tone index-1024 of the existing 80 MHz tone plan, and a tone index of a right 160 MHz tone plan is a tone index+512 of the new 160 MHz tone plan.

A pilot subcarrier shall also be corrected according to a location. When nc240 MHz is used, a pilot tone index of a left 160 MHz tone plan is a pilot tone index-512 of the new 160 MHz tone plan, and a pilot tone index of a right 80 MHz tone plan is a pilot tone index+1024 of the existing 80 MHz tone plan.

When cn240 MHz is used, a pilot tone index of the left 80 MHz tone plan is a pilot tone index-1024 of the existing 80 MHz tone plan, and a pilot tone index of a right 160 MHz tone plan is a pilot tone index+512 of the new 160 MHz tone plan.

The aforementioned various non-contiguous combinations may use not only the same band but also different bands. For example, in 80+80+80 MHz, each 80 MHz bandwidth may use 2.4 GH/5 GHz/6 GHz band in transmission.

Specifically, the 240 MHz tone plan may be configured roughly in three ways.

Option 1: combination of three 80 MHz tone plans (80+80+80)

Option 2: combination of two 80 MHz tone plans and one new 160 MHz tone plan (160+80/80+160)

Option 3: alternative 240 MHz tone plan (240)

Non-contiguous may be a case where different bands are used. An index of an RU subcarrier may be corrected based on a location.

An index of a 240 MHz pilot subcarrier may be corrected based on a location as follows.

160 MHz: existing 80 MHz±512 (the same is also applied to RU tone index)

240 MHz: existing 80 MHz±1024, existing 80 MHz (the same is also applied to RU tone index), new 160 MHz±512 (the same is also applied to RU tone index)

2.3. 320 MHz Tone Plan

A configuration of 320 MHz may consider various options as follows.

Option 1: Combination of Four Existing 11Ax 80 MHz Tone Plans

This may be expressed as follows by considering both contiguous and non-contiguous situations.

80+80+80+80 MHz/160+80+80 MHz/80+160+80 MHz/80+80+160 MHz/240+

80 MHz/80+240 MHz/320 MHz

+ means non-contiguous, and 160/240/320 manes that 2/3/4 80 MHz tone plans are contiguously arranged in succession.

<In the Presence of Contiguous Band>

When 160 MHz is used, a tone index of a left 80 MHz tone plan is a tone index-512 of the existing 80 MHz tone plan, and a tone index of a right 80 MHz tone plan is a tone index+512 of the existing 80 MHz tone plan.

When 240 MHz is used, a tone index of a center 80 MHz tone plan is directly a tone index of the existing 80 MHz tone plan, a tone index of the leftmost 80 MHz tone plan is a tone index-1024 of the existing 80 MHz tone plan, and a tone index of the rightmost 80 MHz tone index is a tone index+1024 of the existing 80 MHz tone plan.

When 320 MHz is used, a tone index of a first left 80 MHz tone plan is a tone index-1536 of the existing 80 MHz tone plan, a tone index of a second left 80 MHz tone plan is a tone index-512 of the existing 80 MHz tone plan, a tone index of a third left 80 MHz tone plan is a tone index+512 of the existing 80 MHz tone plan, and a tone index of a fourth left 80 MHz tone plan is a tone index+1536 of the existing 80 MHz tone plan.

The aforementioned various non-contiguous combinations may use not only the same band but also different bands. For example, in 80+160+80 MHz, each 80/160/80 MHz bandwidth may use 2.4 GH/5 GHz/6 GHz band in transmission.

Option 2: Combination of Two New 160 MHz Tone Plans

This may be expressed as follows by considering both contiguous and non-contiguous situations.

160+160 MHz/320 MHz

+ means non-contiguous, and 320 MHz means that two new 160 MHz tone plans are contiguously arranged.

<In the Presence of Contiguous Band>

When 320 MHz is used, a tone index of a left 160 MHz tone plan is a tone index-1024 of the new 160 MHz tone plan, and a tone index of a right 160 MHz tone plan is a tone index+1024 of the existing 160 MHz tone plan.

The aforementioned non-contiguous combinations may use not only the same band but also different bands. For example, in 160+160 MHz, each 160 MHz bandwidth may use 2.4 GH/5 GHz band in transmission.

Option 3: Combination of Two Existing 11ax 80 MHz Tone Plans and One New 160 MHz This may be expressed as follows by considering both contiguous and non-contiguous situations.

$c80+c80+n160$ MHz/$c80+n160$ MHz+$c80/n160+c80+c80$ MHz/$cc160+$ $n160$ MHz/$n160+cc160$ MHz/$ncc320$ MHz/$cnc320$ MHz/$ccn320$ MHz + means non-contiguous, and c80 MHz, cc160 MHz, and n160 MHz respectively mean the existing 11ax 80 MHz tone plan, the existing 11ax contiguous two 80 MHz tone plans, and a new 160 MHz tone plan. ncc320 MHz/cnc320 MHz/ccn320 MHz mean contiguous one new 160 MHz tone plan and existing two 11ax 80 MHz tone plan, and ncc/cnc/ccn denote successive orders of the respective tone plans.

<In the Presence of Contiguous Band>

When cc160 MHz is used, a tone index of a left 80 MHz tone plan is a tone index-512 of the existing 80 MHz tone plan, and a tone index of a right 80 MHz tone plan is a tone index+512 of the existing 80 MHz tone plan.

When ncc320 MHz is used, a tone index of a left 160 MHz tone plan is a tone index-1024 of a 160 MHz tone plan, a tone index of a next 80 MHz tone plan is a tone index+512 of the existing 80 MHz tone plan, and a tone index of a last 80 MHz tone plan is a tone index+1536 of the existing 80 MHz tone plan.

When cnc320 MHz is used, a tone index of a left 80 MHz tone plan is a tone index-1536 of the existing 80 MHz tone plan, a tone index of a center 160 MHz tone plan is directly tone index of the new 160 MHz tone plan, a tone index of a last 80 MHz tone plan is a tone index+1536 of the existing 80 MHz tone plan.

When ccn320 MHz is used, a tone index of a left 80 MHz tone plan is a tone index-1536, a tone index of a next 80

MHz tone plan is a tone index-512 of the existing 80 MHz tone plan, and a tone index of a last 160 MHz tone plan is a tone index+1024 of the new 160 MHz tone plan.

Various combinations of tone plans having different configurations of c80 and n160 may be considered in the aforementioned options. In this case, there is a disadvantage in that an indication for RU allocation may become significantly complex. Therefore, in order to reduce the signaling overhead, it may be limited to use only a structure having a specific order. For example, only c80+c80+n160 MHz/ccn320 MHz may be used.

The aforementioned various non-contiguous combinations may use not only the same band but also different bands. For example, in c80+n160+c80 MHz, each c80/n160/c80 MHz bandwidth may use 2.4 GH/5 GHz/6 GHz band in transmission.

Option 4: Alternative 320 MHz Tone Plan Considering Use of One RF

In case of contiguous 320 MHz, a situation where transmission is performed by using one RF may be considered. In this case, 320 MHz constituted by combining 160 MHz or 80 MHz tone plans has many subcarriers which are wasted. Therefore, a new tone plan may be proposed to increase efficiency and throughput of subcarrier in use.

Hereinafter, the aforementioned tone plan will be described in detail with reference to FIG. 21 to FIG. 23.

Figure 21:
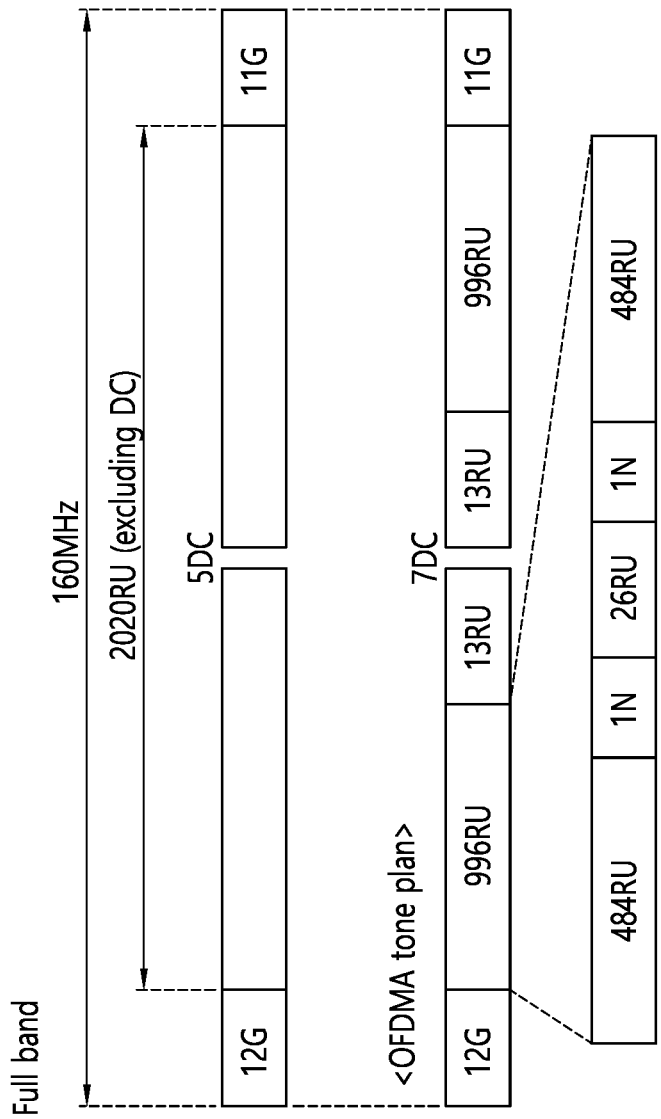
FIG. 21 shows an example of a tone plan in a 160 MHz band according to the present embodiment.

FIG. 21 shows an example of a tone plan in a 160 MHz band according to the present embodiment.

A tone plan in case of a full band and a tone plan in case of applying OFDMA are both illustrated in FIG. 21.

First, in case of the full band, a tone plan of 160 MHz may sequentially consist of 12 guard tones, 2020RU, 5 DC tones, and 11 guard tones. 5 DC tones may be located at the center of 160 MHz, and data may be transmitted in the 2020RU. However, FIG. 21 is for one embodiment only, and thus the 12 guard tones and the 11 guard tones may change in locations. When 7 DC tones are located at the center of 160 MHz, the data may be transmitted in 2018RU.

In case of applying OFDMA, a tone plan of 160 MHz may sequentially consist of 12 guard tones, 996RU, 13RU, 7 DC tones, 13RU, 996RU, and 11 guard tones. In addition, the 996RU may consist of 484RU, one null tone, 26RU, one null tone, and 484RU. However, FIG. 21 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

Figure 22:
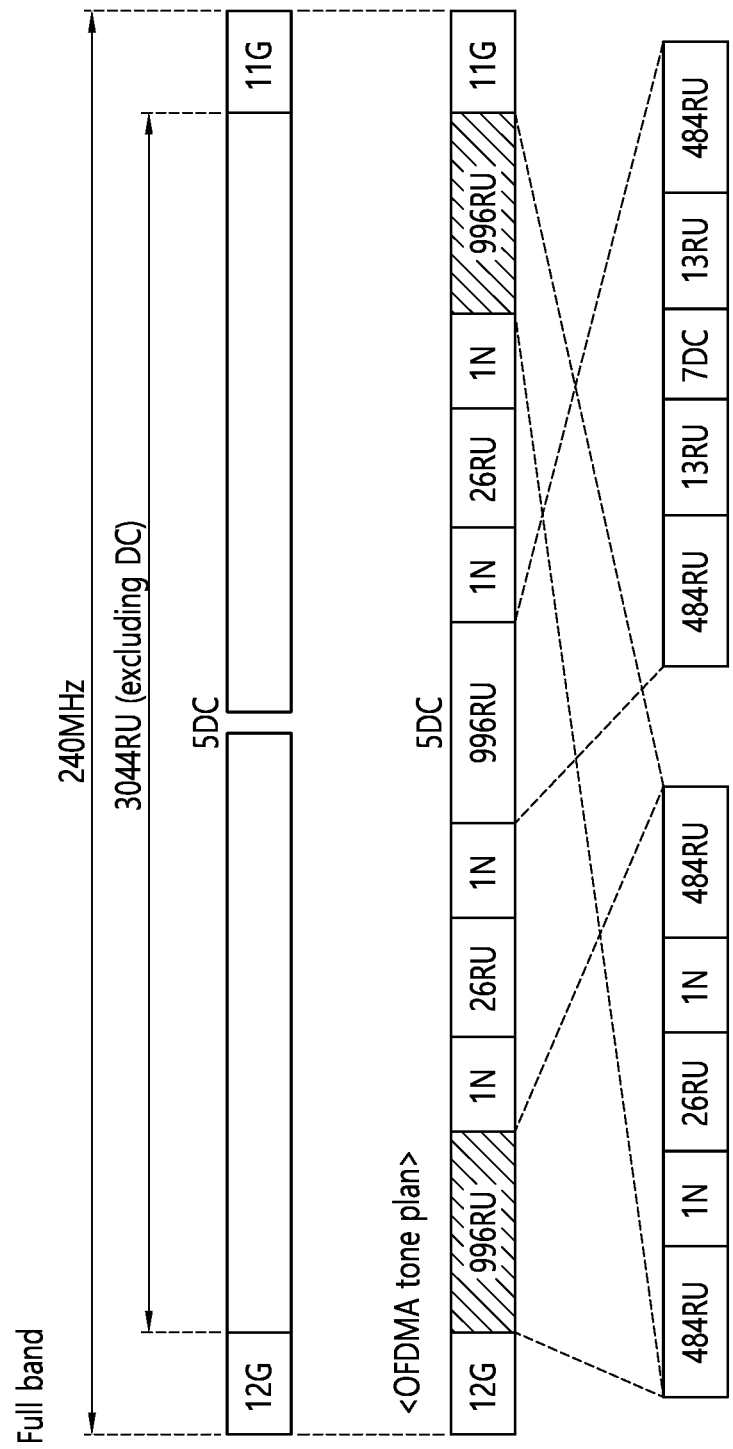
FIG. 22 shows an example of a tone plan in a 240 MHz band according to the present embodiment.

FIG. 22 shows an example of a tone plan in a 240 MHz band according to the present embodiment.

A tone plan in case of a full band proposed in the aforementioned tone plan 1 and a tone plan in case of applying OFDMA are both illustrated in FIG. 22.

First, in case of the full band, a tone plan of 240 MHz may sequentially consist of 12 guard tones, 3044RU, 5 DC tones, and 11 guard tones. 5 DC tones may be located at the center of 160 MHz, and data may be transmitted in the 3044RU. However, FIG. 22 is for one embodiment only, and thus the 12 guard tones and the 11 guard tones may change in locations. When 7 DC tones are located at the center of 240 MHz, the data may be transmitted in 43042RU.

In case of applying OFDMA, a tone plan of 320 MHz may sequentially consist of 12 guard tones, 996RU, 1N, 26RU, 1N, 996RU, 5 DC tones, 1N, 26RU, 1N, 996RU, 11 guard tones.

In addition, the 996RU at both ends may consist of 484RU, one null tone, 26RU, one null tone, and 484RU. The 996RU at the center may consist of 484RU, 13RU, 7 DC tones, 13RU, and 484RU. However, FIG. 13 is for one embodiment only, and thus the 12 guard tones and the 11 guard tones may change in locations. The 996RU at both ends may consist of one null tone, 484RU, 26RU, 484RU, and one null tone.

The 484RU and subordinate RUs are not shown since they may have the same configuration as in the existing 11ax.

When the 240 MHz band is applied to the OFDMA tone plan, an index of a pilot tone in a 996RU located at both ends in the 240 MHz band may be set to ±{24, 92, 158, 226, 266, 334, 400, 468, 536, 604, 670, 738, 778, 846, 912, 980, 1074, 1142, 1208, 1276, 1316, 1384, 1450, 1518}.

When the 240 MHz band is applied to the full band tone plan, an index of a pilot tone may be set to ±{24, 158, 266, 400, 536, 670, 778, 912, 1074, 1208, 1316, 1450}.

However, the index of the pilot tone is only one example, and may be set variously according to a perspective of CFO estimation.

Figure 23:
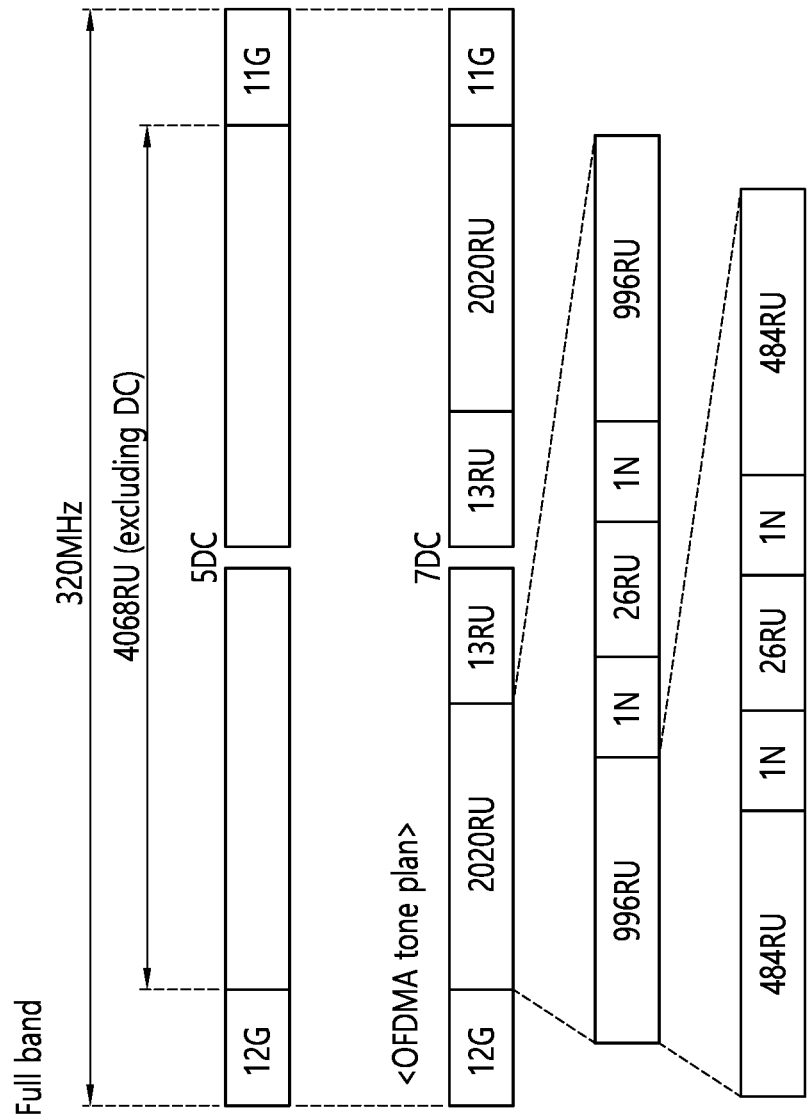
FIG. 23 shows an example of a tone plan in a 320 MHz band according to the present embodiment.

FIG. 23 shows an example of a tone plan in a 320 MHz band according to the present embodiment.

A tone plan in case of a full band and a tone plan in case of applying OFDMA are both illustrated in FIG. 23.

First, in case of the full band, a tone plan of 320 MHz may sequentially consist of 12 guard tones, 4068RU, 5 DC tones, and 11 guard tones. 5 DC tones may be located at the center of 320 MHz, and data may be transmitted in the 4068RU. However, FIG. 23 is for one embodiment only, and thus the 12 guard tones and the 11 guard tones may change in locations. When 7 DC tones are located at the center of 320 MHz, the data may be transmitted in 4066RU.

In case of applying OFDMA, a tone plan of 320 MHz may sequentially consist of 12 guard tones, 2020RU, 13RU, 7 DC tones, 13RU, 2020RU, and 11 guard tones. In addition, the 2020-tone RU may consist of 996RU, one null tone, 26RU, one null tone, and 996RU. In addition, the 996RU may consist of 484RU, one null tone, 26RU, one null tone, and 484RU. However, FIG. 23 is for one embodiment only, and thus the 12 guard tones and the 11 guard tones may change in locations. The 996RU may consist of one null tone, 484RU, 26RU, 484RU, and one null tone.

The 484RU and subordinate RUs are not shown since they may have the same configuration as in the existing 11ax.

3. Examples Applicable to the Present Specification

The present specification proposes an improved STF sequence. For example, when a wide bandwidth is used in a wireless LAN system (802.11), a 1×STF sequence may be proposed.

In the WLAN 802.11 system, in order to increase the peak throughput, it is considered to use a wider band than the existing 11ax or use more antennas to increase the stream transmission. In addition, a method of aggregating various bands is also being considered.

In the present specification, a case of using a wide band is considered, and in particular, a 1×STF sequence is proposed in a situation using 160 MHz/240 MHz/320 MHz.

In the existing 11ax, 1×/2× HE-STF sequence is defined, the 1× HE-STF is used for all HE PPDUs except for HE TB PPDU of uplink (UL) transmission, and the 2× HE-STF is used for HE TB PPDU. The 1× HE-STF sequence is mapped in units of 16 subcarriers, and when IFFT is applied, a 12.8 us symbol is generated and the same signal is repeated in units of 0.8 us. This 0.8 us signal is repeated 5 times to construct a 1× HE-STF signal having a 4 us length. The 2× HE-STF sequence is mapped in units of 8 subcarriers, and when IFFT is applied, a 12.8 us symbol is generated and the same signal is repeated in units of 1.6 us. This 1.6 us signal is repeated 5 times to construct a 2× HE-STF signal having an 8 us length. The present specification relates to the design of a 1×STF sequence used when transmitting a PPDU over a wide bandwidth, and the sequence used in the present specification may be referred to as a 1×EHTTSF sequence.

The configuration of the 1×HESTF sequence may vary according to a tone plan. In the present specification, a newly designed tone plan is considered to improve throughput and efficiency. In the 11ax system, the 160 MHz tone plan was constructed by repeating the 80 MHz tone plan, and because of this structure, 23 tones in the center and some tones in the center of each 80 MHz could not be used. According to the new tone plan, only a part of 23 DC tones that have not been used previously may be nulled, and it may be designed to use center tones of 80 MHz each. Similarly, in 240 MHz and/or 320 MHz transmissions, the tone plan can be defined by minimizing wasted tone. In a situation where the 80 MHz tone plan is repeated, center coefficient(s) and/or edge coefficient(s) in each 80 MHz may be nulled in the 1×EHTTSF sequence, but a specific coefficient can be inserted instead of nulling in the new tone plan. Of course, the coefficient corresponding to DC may be nulled. In this situation, a specific seed sequence (e.g., M sequence of 11ax) and an additional coefficient may be repeated, but the phase rotation value and the additional coefficient of the seed sequence may be optimized.

In the 11ax system, preamble puncturing is defined, in 80 MHz and 160 MHz transmissions, the conventional preamble puncturing is considered as it is, and in 240/320 MHz transmissions, a 1×EHTTSF sequence that can minimize maximum PAPR may be proposed. That is, all cases in which each 20 MHz channel is punctured are considered when transmitting a PPDU in each bandwidth. There are $2^4/2^8/2^{12}/2^{16}$ puncturing cases in 80 MHz/160 MHz/ 240 MHz/320 MHz transmissions. Alternatively, in 240/320 MHz transmissions, an 80 MHz puncturing case is additionally considered in consideration of implementation and signaling complexity. In this case, there are 23/24 puncturing cases in 240 MHz/320 MHz transmissions. Therefore, in the following proposal, a PAPR means the largest PAPR value among several preamble puncturing cases. In calculating the PAPR, only the contiguous bandwidth situation may be considered, but in the repeated tone plan situation, the designed 1×EHTTSF sequence may be applied to the non-contiguous situation (160+160 MHz) as it is. The present specification further considers the maximum transmittable bandwidth capability of RF, and accordingly proposes an optimized sequence as follows.

We propose an optimized sequence using the same M sequence as in the flax system. The M sequence may be as follows.

$$M=\{-1,-1,1,1,1,-1,1,1,1,-1,1,1,-1,1\}$$

In the following example, a method of displaying a sequence may be based on the following method.

For example, in the case of the EHT-STF$_{-496:16:496}$ sequence, the index range of the corresponding sequence is defined between −496 and +496, and the elements of the sequence are defined at intervals of 16 tones. Specific values for indexes −496, −480, −464, . . . −16, 0, +16, . . . , +496 may be assigned/defined.

In the present specification, a 1× sequence may be defined at intervals of 16 indexes (or tones) like the EHT-STF$_{-496:16:496}$ sequence. In addition, a 2× sequence may be defined at intervals of 8 indexes (or tones). For example, a 4× sequence may be defined at intervals of 4 indexes (or tones).

The index of the sequence may indicate a position in the frequency domain, and may be determined based on a subcarrier frequency spacing value. For example, when delta_f (e.g., 78.125 kHz) is applied to the HE-STF sequence (or HE-STF field), index 0 means a DC component/term, and an index of 16 denotes a 16*delta_f kHz point, and an index of −16 denotes a point −16*delta_f kHz. For example, the delta_f value may be set to 312.5 kHz/N (N is an integer), or 312.5 kHz*N (N is an integer).

Meanwhile, for convenience of description, a comma may be omitted in the sequence, for example, {M 1−M0−M1−M}*(1+j)/sqrt(2) means {M, 1, −M, 0, −M, 1, −M}*(1+j)/sqrt(2).

3.1 RF Capability Allows One RF to Transmit the Entire/Full PPDU Bandwidth
1) 80 MHz $$\text{EHT-STR}_{-496:16:496}=\{M-1-M\,0-M-1\,M\}*(1+j)/sqrt(2)$$

PAPR is 5.9810 dB.
2) 160 MHz $$\text{EHT-STF}_{-1008:16:1008}=\{M-1-M-1\,M-1\\ M\,0-M\,1-M\,1-M\,1\,M\}*(1+j)/sqrt(2)$$

PAPR is 7.7700 dB.
3) 320 MHz

The 320 MHz tone plan may be proposed in two cases.

The first proposal is to propose an optimized sequence in a situation where only the STF coefficient corresponding to DC component(s) is nulled by minimizing wasted tone(s).

The second proposal, in consideration of a 320 MHz tone plan formed by repeating a 160 MHz tone plan, repeats the sequence proposed in the above Section 2) and proposes an optimized sequence by applying additional phase rotation. In the existing 11ax system, when constructing a 160 MHz sequence, the sequence was constructed in such a way that the 80 MHz HESTF sequence was repeated and the PAPR was lowered by multiplying the first 40 MHz part of the secondary 80 MHz channel (or the 80 MHz channel with a relatively high frequency) by −1. By extending this as it is, the present specification proposes a sequence for lowering PAPR by applying additional phase rotation in units of 20/40/80/160 MHz to a secondary 160 MHz channel (or a 160 MHz channel having a relatively high frequency). This method is also applied to other 320 MHz proposals below.

Option 1: Method of repeating 160 MHz 1×EHTTSF sequence in the tone plan where the 160 MHz tone plan is repeated $$\text{EHT-STF}_{-2032:16:2032}=\{M-1-M-1\,M-1\,M\,0-M\\ 1-M\,1-M\,1\,M\,0\,M-1-M-1\,M-1\,M\,0-M\\ 1-M\,1-M\,1\,M\}*(1+j)/sqrt(2)$$

PAPR is 10.7803 dB.

Option 2: Method of repeating 160 MHz 1×EHTTSF sequence in the tone plan in which the 160 MHz tone plan is repeated and applying additional phase rotation in units of 20 MHz to a 160 MHz channel having a relatively high frequency A sequence for optimizing the PAPR by applying additional phase rotation in units of 20 MHz to a secondary 160 MHz channel (or a 160 MHz channel having a relatively high frequency) is proposed.

$EHT\text{-}STR_{-2032:16:2032} = \{M\ -1\ -M\ -1\ M\ -1\ M\ 0\ -M$
$1\ -M\ 1\ -M\ 1\ M\ 0\ -M\ -1\ -M\ 1\ -M\ 1\ -M\ 0\ M$
$-1\ M\ -1\ M\ 1\ M\}*(1+j)/sqrt(2)$ PAPR is 10.7803 dB.

Option 3: Method of repeating 160 MHz 1×EHTTSF sequence in the tone plan in which the 160 MHz tone plan is repeated and applying additional phase rotation in units of 40 MHz to a 160 MHz channel with a relatively high frequency.

This is a sequence that optimizes PAPR by applying additional phase rotation in units of 40 MHz to a secondary 160 MHz channel (or a 160 MHz channel having a relatively high frequency).

$EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ -M\ 1\ M\ 1\ -M\ 1\ -M\ 0\ M\text{-}1$
$M\text{-}1\ M\text{-}1\ -M\}*(1+j)/sqrt(2)$ PAPR is 10.7803 dB.

Option 4: Method of repeating 160 MHz 1×EHTTSF sequence in the tone plan in which the 160 MHz tone plan is repeated and applying additional phase rotation in units of 80 MHz to a 160 MHz channel with a relatively high frequency This is a sequence for optimizing PAPR by applying additional phase rotation in units of 80 MHz to a secondary 160 MHz channel (or a 160 MHz channel having a relatively high frequency).

$EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ -M\ 1\ M\ 1\ -M\ 1\ -M\ 0\ M\text{-}1$
$M\text{-}1\ M\text{-}1\ -M\}*(1+j)/sqrt(2)$ PAPR is 10.7803 dB.

Option 5: Method of repeating 160 MHz 1×EHTTSF sequence in the tone plan in which the 160 MHz tone plan is repeated and applying additional phase rotation in units of 160 MHz to a 160 MHz channel with a relatively high frequency This is a sequence for optimizing PAPR by applying additional phase rotation in units of 160 MHz to a secondary 160 MHz channel (or a 160 MHz channel having a relatively high frequency).

$EHT\text{-}STF\_2032:16:2032 = \{M\text{-}1\text{-}M\text{-}1\ M\text{-}1\ M\ 0\text{-}M$
$1\text{-}M\ 1\text{-}M\ 1\ M\ 0\text{-}M\ 1\ M\ 1\text{-}M\ 1\ -M\ 0\ M\text{-}1$
$M\text{-}1\ M\text{-}1\text{-}M\}*(1+j)/sqrt(2)$ PAPR is 10.7803 dB.

In consideration of the preamble puncturing in the 320 MHz band in which the 160 MHz tone plan is repeated (Option 2 to Option 6), it is possible to use any of the 1×EHTTSF sequences proposed in Option 2 to Option 6 from the PAPR point of view.

4) 160+160 MHz (Including Non-Contiguous)

The present example proposes a scheme in which the PAPR superior sequence proposed for the 320 MHz band is used in a discontinuous 160+160 MHz band (or channel). For a primary 160 MHz among discontinuous 160+160 MHz channels, among the PAPR superior sequences proposed for the contiguous 320 MHz band, a sequence applied to 160 MHz having a relatively low frequency may be applied. Further, for a secondary 160 MHz, a sequence applied to 160 MHz having a relatively high frequency may be applied.

i) Sequence for Primary 160 MHz Channel:

$EHT\text{-}STF_{-1008:16:1008} = \{M\text{-}1\ -M\text{-}1\ M\text{-}1\ M\ 0\ -M\ 1$
$-M\ 1\ -M\ 1\ M\}*(1+j)/sqrt(2)$ ii) Sequence for Secondary 160 MHz Channel $EHT\text{-}STF_{-1008:16:1008} = \{-M\ 1\ M\ 1\ -M\ 1\ -M\ 0\ M\text{-}1$
$M\text{-}1\ M\text{-}1\ -M\}*(1+j)/sqrt(2)$ The following is an optimized 1×EHTTSF sequence in a preamble puncturing situation based on 80 MHz.

5) 240 MHz $EHT\text{-}STF_{-1520:16:1520} = \{M\text{-}1\ -M\text{-}1\ M\text{-}1\ M\text{-}1\ M\ 1$
$-M\ 0\ -M\ 1\ M\ 1\ -M\ 1\ M\ 1\ M\text{-}1\ M\}*(1+j)/sqrt$
$(2)$ PAPR is 5.7153 dB.

6) 320 MHz

The 320 MHz tone plan may be proposed in two cases.

The first proposal is to propose an optimized sequence in a situation where only the STF coefficient corresponding to DC component(s) is nulled by minimizing wasted tone(s).

Second, considering the 320 MHz tone plan formed by repeating the 160 MHz tone plan, the sequence proposed in 2) is repeated and an optimized sequence is proposed by applying additional phase rotation.

Option 1: Method of repeating 160 MHz 1×EHTTSF sequence in the tone plan where the 160 MHz tone plan is repeated $EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ M\text{-}1\ -M\text{-}1\ M\text{-}1\ M\ 0\ -M\ 1$
$-M\ 1\ -M\ 1\ M\}*(1+j)/sqrt(2)$ PAPR is 8.0057 dB.

Option 2: Method of repeating 160 MHz 1×EHTTSF sequence in the tone plan in which the 160 MHz tone plan is repeated and applying additional phase rotation in units of 20 MHz to a 160 MHz channel having a relatively high frequency A sequence for optimizing the PAPR by applying additional phase rotation in units of 20 MHz to a secondary 160 MHz channel (or a 160 MHz channel having a relatively high frequency) is proposed.

$EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ -M\text{-}1\ -M\text{-}1\ M\ 1\ -M\ 0\ M\ 1$
$-M\ 1\ -M\text{-}1\ -M\}*(1+j)/sqrt(2)$ PAPR is 7.2250 dB.

Option 3: Method of repeating 160 MHz 1×EHTTSF sequence in the tone plan in which the 160 MHz tone plan is repeated and applying additional phase rotation in units of 40 MHz to a 160 MHz channel with a relatively high frequency.

This is a sequence that optimizes PAPR by applying additional phase rotation in units of 40 MHz to a secondary 160 MHz channel (or a 160 MHz channel having a relatively high frequency).

$EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ -M\ 1\ M\text{-}1\ M\text{-}1\ M\ 0\ M\text{-}1\ M$
$1\ -M\ 1\ M\}*(1+j)/sqrt(2)$ PAPR is 7.3528 dB.

Option 4: Method of repeating 160 MHz 1×EHTTSF sequence in the tone plan in which the 160 MHz tone plan is repeated and applying additional phase rotation in units of 80 MHz to a 160 MHz channel with a relatively high frequency This is a sequence for optimizing PAPR by applying additional phase rotation in units of 80 MHz to a secondary 160 MHz channel (or a 160 MHz channel having a relatively high frequency).

$EHT\text{-}STF_{-2032:16:2032} = \{M\text{-}1\ -M\text{-}1\ M\text{-}1\ M\ 0\ -M\ 1$
$-M\ 1\ -M\ 1\ M\ 0\ M\text{-}1\ -M\text{-}1\ M\text{-}1\ M\ 0\ M\text{-}1$
$M\text{-}1\ M\text{-}1\ -M\}*(1+j)/sqrt(2)$ PAPR is 7.7065 dB.

Option 5: Method of repeating 160 MHz 1×EHTTSF sequence in the tone plan in which the 160 MHz tone plan is repeated and applying additional phase rotation in units of 160 MHz to a 160 MHz channel with a relatively high frequency This is a sequence for optimizing PAPR by applying additional phase rotation in units of 160 MHz to a secondary 160 MHz channel (or a 160 MHz channel having a relatively high frequency).

$EHT\text{-}STF_{-2032:16:2032} = \{M-1\ -M-1\ M-1\ M\ 0\ -M\ 1\ -M\ 1\ -M\ 1\ M\ 0\ -M\ 1\ M\ 1\ -M\ 1\ -M\ 0\ M-1\ M-1\ M-1\ -M\}*(1+j)/sqrt(2)$ PAPR is 7.7065 dB.

In consideration of the preamble puncturing in the 320 MHz band in which the 160 MHz tone plan is repeated (Option 2 to Option 6), it is preferable to use the 1×EHTTSF sequences proposed in Option 3 from the PAPR point of view.

7) 160+160 MHz (Including Non-Contiguous)

The present example proposes a scheme in which the PAPR superior sequence proposed for the 320 MHz band is used in a discontinuous 160+160 MHz band (or channel). For a primary 160 MHz among discontinuous 160+160 MHz channels, among the PAPR superior sequences proposed for the contiguous 320 MHz band, a sequence applied to 160 MHz having a relatively low frequency may be applied. Further, for a secondary 160 MHz, a sequence applied to 160 MHz having a relatively high frequency may be applied.

i) Sequence for Primary 160 MHz Channel:

$EHT\text{-}STF_{-1008:16:1008} = \{M\ -1\ -M\ -1\ M\ -1\ M\ 0\ -M\ 1\ -M\ 1\ -M1M\}*(1+j)/sqrt(2)$ ii) Sequence for Secondary 160 MHz Channel $EHT\text{-}STF_{-1008:16:1008} = \{-M\ 1M\ 1\ -M1\ -M0M\ -1M\ -1M\ -1\ -M\}*(1+j)/sqrt(2)$ 3.2. Considering Various RF Capabilities, that is, the Situation where the Maximum Transmittable Bandwidth of RF is 80/160/240/320 MHz, Etc.

For example, when transmitting a 160 MHz PPDU, a RF capable of supporting two 80 MHz bands may be used, or a RF supporting one 160 MHz band may be used. Therefore, when optimizing the sequence, the maximum PAPR is calculated by considering the PAPR of two 80 MHz parts and one 160 MHz part in each preamble puncturing case, and a sequence that minimizes the maximum PAPR can be designed by comparing them again for each preamble puncturing case. Hereinafter, PAPR is the max PAPR value found by taking max PAPR among PAPRs of several 80/160/240/320 MHz parts in each preamble puncturing case and comparing it again in all preamble puncturing cases.

1) 80 MHz $EHT\text{-}STF_{-496:16:496} = \{M-1\ -M\ 0\ -M-1\ M\}*(1+j)/sqrt(2)$ PAPR is 5.9810 dB.

2) 160 MHz $EHT\text{-}STF\_1008:16:1008 = \{M-1\ -M-1\ M-1\ M\ 0\ -M\ 1\ -M\ 1\ -M\ 1\ M\}*(1+j)/sqrt(2)$ PAPR is 7.7700 dB.

3) 320 MHz

The 320 MHz tone plan may be proposed in two cases.

The first proposal is to propose an optimized sequence in a situation where only the STF coefficient corresponding to DC component(s) is nulled by minimizing wasted tone(s).

The second proposal, in consideration of a 320 MHz tone plan formed by repeating a 160 MHz tone plan, repeats the sequence proposed in the above Section 2) and proposes an optimized sequence by applying additional phase rotation.

Option 1: Method of repeating 160 MHz 1×EHTTSF sequence in the tone plan where the 160 MHz tone plan is repeated $EHT\text{-}STF_{-2032:16:2032} = \{M-1\ -M-1\ M-1\ M\ 0\ -M\ 1\ -M\ 1\ -M\ 1\ M\ 0\ M-1\ -M-1\ M-1\ M\ 0\ -M\ 1\ -M\ 1\ -M\ 1\ M\}*(1+j)/sqrt(2)$ PAPR is 10.7803 dB.

Option 2: Method of repeating 160 MHz 1×EHTTSF sequence in the tone plan in which the 160 MHz tone plan is repeated and applying additional phase rotation in units of 20 MHz to a 160 MHz channel having a relatively high frequency A sequence for optimizing the PAPR by applying additional phase rotation in units of 20 MHz to a secondary 160 MHz channel (or a 160 MHz channel having a relatively high frequency) is proposed.

$EHT\text{-}STF_{-2032:16:2032} = \{M-1\ -M-1\ M-1\ M\ 0\ -M\ 1\ -M\ 1\ -M\ 1\ M\ 0\ -M\ 1\ M\ 1\ -M\ 1\ -M\ 0\ M-1\ M-1\ M-1\ -M\}*(1+j)/sqrt(2)$ PAPR is 10.7803 dB.

Option 3: Method of repeating 160 MHz 1×EHTTSF sequence in the tone plan in which the 160 MHz tone plan is repeated and applying additional phase rotation in units of 40 MHz to a 160 MHz channel with a relatively high frequency.

A sequence for optimizing the PAPR by applying additional phase rotation in units of 40 MHz to a secondary 160 MHz channel (or a 160 MHz channel having a relatively high frequency) is proposed.

$EHT\text{-}STF_{-2032:16:2032} = \{M-1\ -M-1\ M-1\ M\ 0\ -M\ 1\ -M\ 1\ -M\ 1\ M\ 0\ -M\ 1\ M\ 1\ -M\ 1\ -M\ 0\ M-1\ M-1\ M-1\ -M\}*(1+j)/sqrt(2)$ PAPR is 10.7803 dB.

Option 4: This is a sequence for optimizing PAPR by applying additional phase rotation in units of 80 MHz to a secondary 160 MHz channel (or a 160 MHz channel having a relatively high frequency).

This is a sequence for optimizing PAPR by applying additional phase rotation in units of 80 MHz to a secondary 160 MHz channel (or a 160 MHz channel having a relatively high frequency).

$EHT\text{-}STF_{-2032:16:2032} = \{M-1\ -M-1\ M-1\ M\ 0\ -M\ 1\ -M\ 1\ -M\ 1\ M\ 0\ -M\ 1\ M\ 1\ -M\ 1\ -M\ 0\ M-1\ M-1\ M-1\ -M\}*(1+j)/sqrt(2)$ PAPR is 10.7803 dB.

Option 5: Method of repeating 160 MHz 1×EHTTSF sequence in the tone plan in which the 160 MHz tone plan is repeated and applying additional phase rotation in units of 160 MHz to a 160 MHz channel with a relatively high frequency This is a sequence for optimizing PAPR by applying additional phase rotation in units of 160 MHz to a secondary 160 MHz channel (or a 160 MHz channel having a relatively high frequency).

$EHT\text{-}STF_{-2032:16:2032} = \{M\ -1\ -M-1\ M-1\ M\ 0\ -M\ 1\ -M\ 1\ -M\ 1\ M\ 0\ -M\ 1\ M\ 1\ -M\ 1\ -M\ 0\ M-1\ M-1\ M-1\ -M\}*(1+j)/sqrt(2)$ PAPR is 10.7803 dB.

In consideration of the preamble puncturing in the 320 MHz band in which the 160 MHz tone plan is repeated (Option 2 to Option 6), it is possible to use any of the 1×EHTTSF sequences proposed in Option 2 to Option 6 from the PAPR point of view.

4) 160+160 MHz (Including Non-Contiguous)

The present example proposes a scheme in which the PAPR superior sequence proposed for the 320 MHz band is used in a discontinuous 160+160 MHz band (or channel). For a primary 160 MHz among discontinuous 160+160 MHz channels, among the PAPR superior sequences proposed for the contiguous 320 MHz band, a sequence applied to 160 MHz having a relatively low frequency may be applied. Further, for a secondary 160 MHz, a sequence applied to 160 MHz having a relatively high frequency may be applied.

i) Sequence for Primary 160 MHz Channel:

$EHT\text{-}STF_{-1008:16:1008} = \{M\ -1\ -M\!-\!1\ M\!-\!1\ M\ 0\ -M\ 1\ -M\ 1\ -M\ 1\ M\}*(1+j)/sqrt(2)$ ii) Sequence for Secondary 160 MHz Channel $EHT\text{-}STF_{-1008:16:1008} = \{-M\ 1\ M\ 1\ -M\ 1\ -M\ 0\ M\!-\!1\ M\!-\!1\ M\!-\!1\ -M\}*(1+j)/sqrt(2)$ The following is an optimized 1×EHTTSF sequence in a preamble puncturing situation based on 80 MHz.

5) 240 MHz $EHT\text{-}STF_{-1520:16:1520} = \{M\ -1\!-\!M\ -1M\!-\!1M\!-\!1M\ 1\!-\!M0\!-\!M1M1\!-\!M1M1M\!-\!1\ M\}*(1+j)/sqrt(2)$ PAPR is 5.7153 dB.

6) 320 MHz

The 320 MHz tone plan may be proposed in two cases.

The first proposal is to propose an optimized sequence in a situation where only the STF coefficient corresponding to DC component(s) is nulled by minimizing wasted tone(s).

The second proposal, in consideration of a 320 MHz tone plan formed by repeating a 160 MHz tone plan, repeats the sequence proposed in the above Section 2) and proposes an optimized sequence by applying additional phase rotation.

Option 1: Method of repeating 160 MHz 1×EHTTSF sequence in the tone plan where the 160 MHz tone plan is repeated $EHT\text{-}STF_{-2032:16:2032} = \{M\!-\!1\ -M\!-\!1\ M\!-\!1\ M\ 0\ -M\ 1\ -M\ 1\ -M\ 1\ M\ 0\ M\!-\!1\ -M\!-\!1\ M\!-\!1\ M\ 0\ -M\ 1\ -M\ 1\ -M\ 1\ M\}*(1+j)/sqrt(2)$ PAPR is 8.0057 dB.

Option 2: Method of repeating 160 MHz 1×EHTTSF sequence in the tone plan in which the 160 MHz tone plan is repeated and applying additional phase rotation in units of 20 MHz to a 160 MHz channel having a relatively high frequency A sequence for optimizing the PAPR by applying additional phase rotation in units of 20 MHz to a secondary 160 MHz channel (or a 160 MHz channel having a relatively high frequency) is proposed.

$EHT\text{-}STF_{-2032:16:2032} = \{M\!-\!1\ -M\!-\!1\ M\!-\!1\ M\ 0\ -M\ 1\ -M\ 1\ -M\ 1\ M\ 0\ -M\!-\!1\ -M\!-\!1\ M\ 1\ -M\ 0\ M\ 1\ -M\ 1\ -M\!-\!1\ -M\}*(1+j)/sqrt(2)$ PAPR is 7.2250 dB.

Option 3: Method of repeating 160 MHz 1×EHTTSF sequence in the tone plan in which the 160 MHz tone plan is repeated and applying additional phase rotation in units of 40 MHz to a 160 MHz channel with a relatively high frequency.

A sequence for optimizing the PAPR by applying additional phase rotation in units of 40 MHz to a secondary 160 MHz channel (or a 160 MHz channel having a relatively high frequency) is proposed.

$EHT\text{-}STF_{-2032:16:2032} = \{M\!-\!1\ -M\!-\!1\ M\!-\!1\ M\ 0\ -M\ 1\ -M\ 1\ -M\ 1\ M\ 0\ -M\ 1\ M\!-\!1\ M\!-\!1\ -M\ 0\ M\!-\!1\ M\ 1\ -M\ 1\ M\}*(1+j)/sqrt(2)$ PAPR is 7.3528 dB.

Option 4: Method of repeating 160 MHz 1×EHTTSF sequence in the tone plan in which the 160 MHz tone plan is repeated and applying additional phase rotation in units of 80 MHz to a secondary channel This is a sequence for optimizing PAPR by applying additional phase rotation in units of 80 MHz to a secondary 160 MHz channel (or a 160 MHz channel having a relatively high frequency).

$EHT\text{-}STF_{-2032:16:2032} = \{M\!-\!1\ -M\!-\!1\ M\!-\!1\ M\ 0\ -M\ 1\ -M\ 1\ -M\ 1\ M\ 0\ M\!-\!1\ -M\!-\!1\ M\!-\!1\ M\ 0\ M\!-\!1\ M\!-\!1\ M\!-\!1\ -M\}*(1+j)/sqrt(2)$ PAPR is 7.7065 dB.

Option 5: Method of repeating 160 MHz 1×EHTTSF sequence in the tone plan in which the 160 MHz tone plan is repeated and applying additional phase rotation in units of 160 MHz to a 160 MHz channel with a relatively high frequency This is a sequence for optimizing PAPR by applying additional phase rotation in units of 160 MHz to a secondary 160 MHz channel (or a 160 MHz channel having a relatively high frequency).

$EHT\text{-}STF_{-2032:16:2032} = \{M\!-\!1\ -M\!-\!1\ M\!-\!1\ M\ 0\ -M\ 1\ -M\ 1\ -M\ 1\ M\ 0\ -M\ 1\ M\ 1\ -M\ 1\ -M\ 0\ M\!-\!1\ M\!-\!1\ M\!-\!1\ -M\}*(1+j)/sqrt(2)$ PAPR is 7.7065 dB.

In consideration of the preamble puncturing in the 320 MHz band in which the 160 MHz tone plan is repeated (Option 2 to Option 6), it is preferable to use the 1×EHTTSF sequences proposed in Option 3 from the PAPR point of view.

7) 160+160 MHz (Including Non-Contiguous)

The present example proposes a scheme in which the PAPR superior sequence proposed for the 320 MHz band is used in a discontinuous 160+160 MHz band (or channel). For a primary 160 MHz among discontinuous 160+160 MHz channels, among the PAPR superior sequences proposed for the contiguous 320 MHz band, a sequence applied to 160 MHz having a relatively low frequency may be applied. Further, for a secondary 160 MHz, a sequence applied to 160 MHz having a relatively high frequency may be applied.

i) Sequence for Primary 160 MHz Channel:

$EHT\text{-}STF_{-1008:16:1008} = \{M\!-\!1\ -M\!-\!1\ M\!-\!1\ M\ 0\ -M\ 1\ -M\ 1\ -M\ 1\ M\}*(1+j)/sqrt(2)$ ii) Sequence for Secondary 160 MHz Channel $EHT\text{-}STF_{-1008:16:1008} = \{-M\ 1\ M\ 1\ -M\ 1\ -M\ 0\ M\!-\!1\ M\!-\!1\ M\!-\!1\ -M\}*(1+j)/sqrt(2)$ The proposal of Section 3.2 considering various RF capabilities may be a more reasonable scheme.

Hereinafter, the aforementioned embodiment is described with reference to FIG. 18 to FIG. 23.

Figure 24:
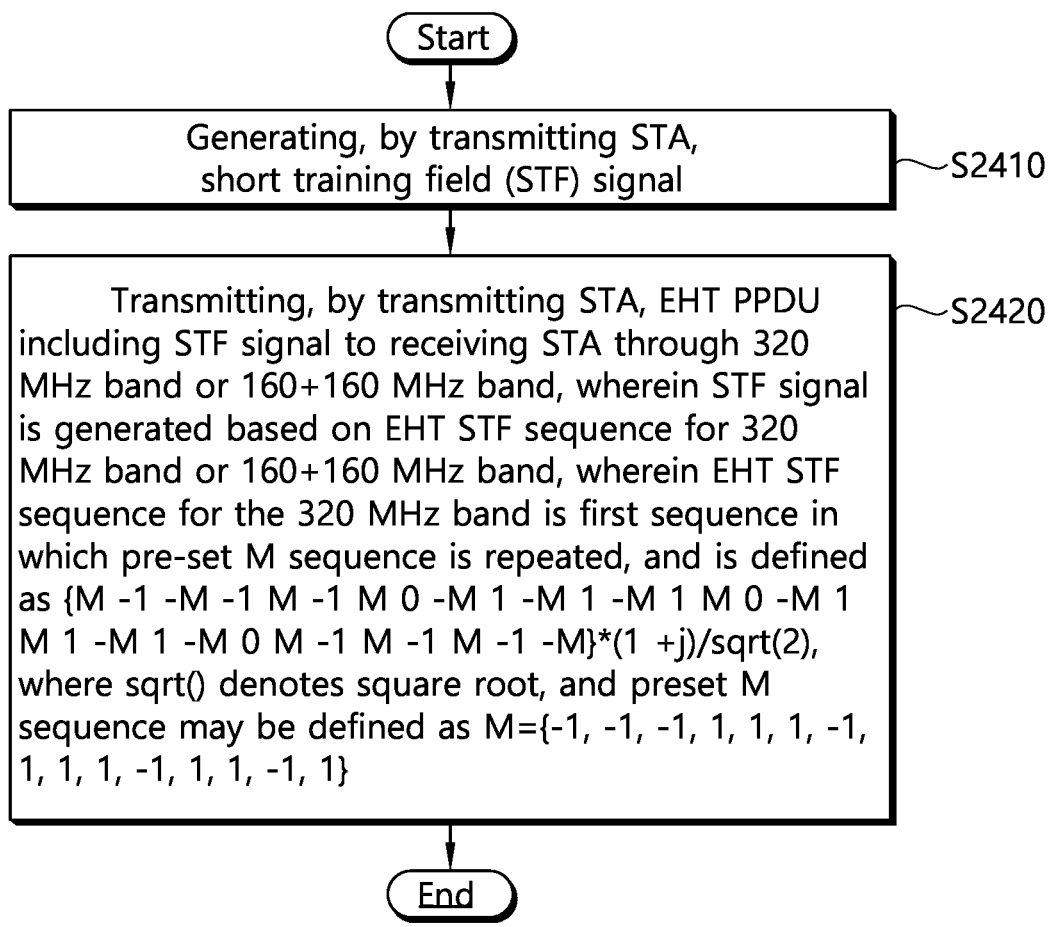
FIG. 24 is a flowchart illustrating a procedure in which a transmitting STA transmits an EHT PPDU according to the present embodiment.

FIG. 24 is a flowchart illustrating a procedure in which a transmitting STA transmits an EHT PPDU according to the present embodiment.

An example of FIG. 24 may be performed in a network environment in which a next-generation WLAN system is supported. The next-generation WLAN system is a WLAN system evolved from an 802.11ax system, and may satisfy backward compatibility with the 802.11ax system.

The next-generation WLAN system (IEEE 802.11be or EHT WLAN system) may support a wideband to increase a throughput. The wideband includes 160 MHz, 240 MHz, and 320 MHz bands (or a 160+160 MHz band). In the present embodiment, an STF sequence for obtaining an optimal peak-to-average power ratio (PAPR) is proposed by considering a tone plane for each band, whether preamble puncturing is performed, and radio frequency (RF) capability.

An example of FIG. 24 may be performed by a transmitting station (STA), and the transmitting STA may correspond to an access point (AP). A receiving STA of FIG. 24 may correspond to an STA supporting an EHT WLAN system.

In S2410, the transmitting STA generates a short training field (STF) signal.

In S2420, the transmitting STA transmits the EHT PPDU including the STF signal to the receiving STA through a 320 MHz band or a 160+160 MHz band. The 320 MHz band is a contiguous band, and the 160+160 MHz band is a non-contiguous band.

The STF signal is generated based on an EHT STF sequence for the 320 MHz band or the 160+160 MHz band.

The EHT STF sequence for the 320 MHz band is a first sequence in which a pre-set M sequence is repeated, and is defined as follows.

{M −1−M−1M−1M0−M1−M1−M1M0−M1 M1−M1−M0M−1M−1M}*(1+j)/sqrt(2), where sqrt( ) denotes a square root. Further, * denotes a multiplication operator.

The preset M sequence may be defined as follows.

$M=\{-1,-1,-1,1,1,1,-1,1,1,1,-1,1,1,-1,1\}$

The preset M sequence may be the same as the M sequence defined in 801.11ax.

The first sequence (that is {M −1−M−1M−1M0−M1−M1−M1M0−M1M1−M 1−M0M−1M−1M−1−M}*(1+j)/sqrt(2)) can be mapped to frequency tones at intervals of 16 tones from the lowest tone having a tone index of −2032 to the highest tone having a tone index of +2032. When the EHT SFT sequence (or the first sequence) is mapped to a frequency tone (or subcarrier) corresponding to the 320 MHz band in units of 16 frequency tones, an Inverse Fast Fourier Transform (IFFT) may be performed to generate a time domain signal of 12.8 us in which the same signal with a period of 0.8 us is repeated 16 times. At this time, it is possible to create a 1×STF signal of 4 us by repeating the 0.8 us signal only 5 times. The STF signal may be the 1×STF signal. In addition, the transmitting STA may perform the IFFT in consideration of all RF units (considering all cases where one RF can transmit through the entire PPDU bandwidth or the maximum transmittable bandwidth of RF is 80/160/240/320 MHz) for the EHT SFT sequence (or the first sequence).

In addition, the EHT STF sequence for the 160+160 MHz band may consist of a second sequence for a primary 160 MHz channel and a third sequence for a secondary 160 MHz channel.

The second sequence may be defined as follows.

{M−1 −M−1 M−1 M 0 −M 1 −M 1 −M 1 M}*(1+j)/sqrt(2)

The third sequence may be defined as follows.

{−M 1 M 1 −M 1 −M 0 M−1 M−1 M−1 −M}*(1+j)/sqrt(2)

The second and third sequences may be mapped to frequency tones at intervals of 16 tones from the lowest tone having a tone index of −1008 to the highest tone having a tone index of +1008.

The 320 MHz band may include a lower 160 MHz channel having a relatively low tone index and a higher 160 MHz channel having a relatively high tone index.

In detail, the first sequence may be generated by applying a phase rotation in units of 80 MHz to the sequence for the higher 160 MHz channel in the fourth sequence in which the High Efficiency (HE) STF sequence for the 160 MHz band is repeated. The HE STF sequence for the 160 MHz band may be an optimized 160 MHz 1× HE STF sequence (i.e., {M −1−M−1M−1M0−M1−M1−M1M}*(1+j)/sqrt(2)).

The fourth sequence may be defined as follows.

{M−1 −M−1 M−1 M 0 −M 1 −M 1 −M 1 M 0 M−1
−M−1 M−1 M 0 −M 1 −M 1 −M 1 M}*
(1+j)/sqrt(2)

The phase rotation may be applied to a sequence for an 80 MHz channel having a low tone index and an 80 MHz channel having a high tone index in the higher 160 MHz channel. That is, the phase rotation can be applied for both 80 MHz channels. In this case, the value of the phase rotation may be −1. That is, in the fourth sequence, if the sequence for the higher 160 MHz channel that is {M −1−M−1M−1M0−M1−M1−M1M}*(1+j)/sqrt(2)) is multiplied by −1, the first sequence (i.e., {M−1−M−1M−1M0−M 1−M1−M1M0−M1M1−M1−M0M−1M−1M−1−M}*(1+j)/sqrt(2)) may be obtained.

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

Figure 25:
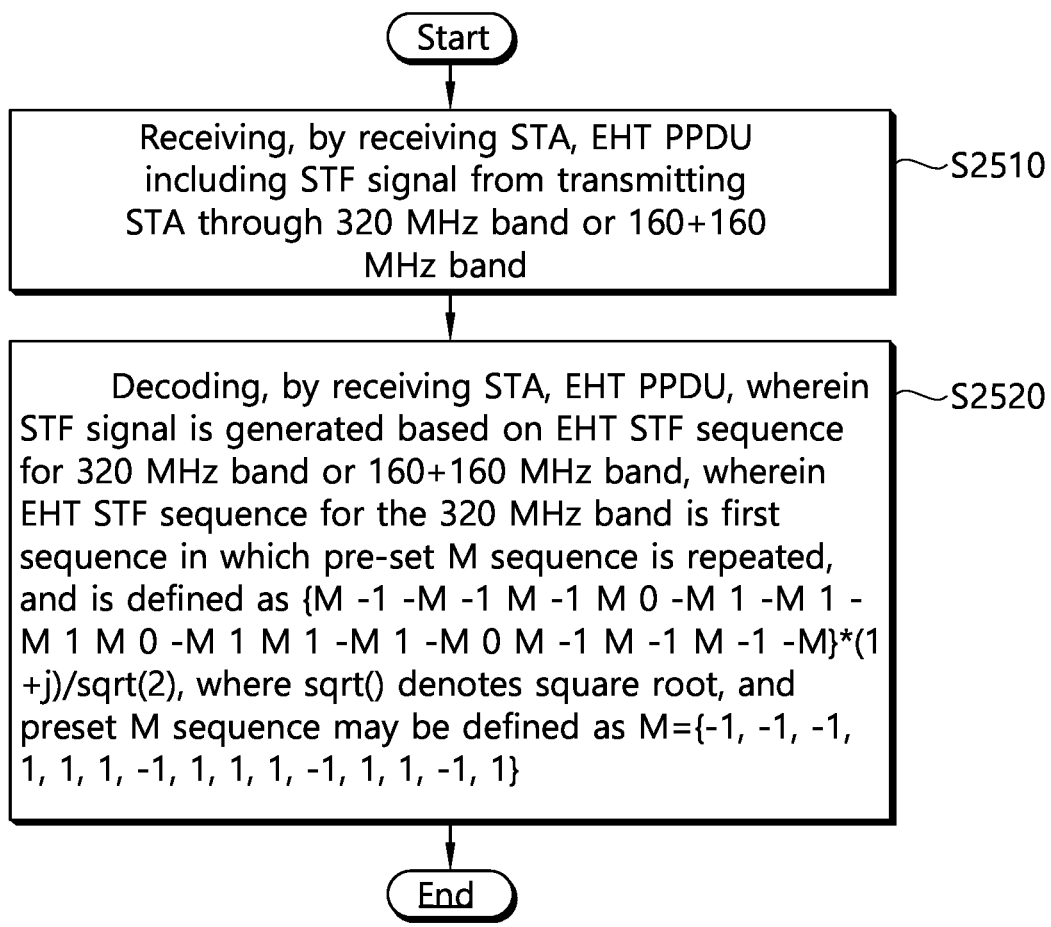
FIG. 25 is a flowchart illustrating a procedure in which a receiving STA receives an EHT PPDU according to the present embodiment.

FIG. 25 is a flowchart illustrating a procedure in which a receiving STA receives an EHT PPDU according to the present embodiment.

An example of FIG. 25 may be performed in a network environment in which a next-generation WLAN system is supported. The next-generation WLAN system is a WLAN system evolved from an 802.11ax system, and may satisfy backward compatibility with the 802.11ax system.

The next-generation WLAN system (IEEE 802.11be or EHT WLAN system) may support a wideband to increase a throughput. The wideband includes 160 MHz, 240 MHz, and 320 MHz bands (or a 160+160 MHz band). In the present embodiment, an STF sequence for obtaining an optimal PAPR is proposed by considering a tone plane for each band, whether preamble puncturing is performed, and RF capability.

The example of FIG. 25 may be performed by the receiving STA which may correspond to an STA supporting an EHT WLAN system. A transmitting STA of FIG. 25 may correspond to an AP.

In S2510, the receiving station (STA) receives the EHT PPDU including a Short Training Field (STF) signal from the transmitting STA through a 320 MHz band or a 160+160 MHz band. The 320 MHz band may be a continuous band, and the 160+160 MHz band may be a discontinuous band.

In S2520, the receiving STA decodes the EHT PPDU. In addition, the receiving STA may perform automatic gain control (AGC) estimation in multiple input multiple output (MIMO) transmission based on the STF signal.

The STF signal is generated based on the EHT STF sequence for the 320 MHz band or the 160+160 MHz band.

The EHT STF sequence for the 320 MHz band is a first sequence in which a pre-set M sequence is repeated, and is defined as follows.

{M −1−M−1M−1M0−M1−M1−M1M0−M1 M1−M1−M0M−1M−1M−1−M}*(1+j)/sqrt(2), where sqrt( ) denotes a square root. Further, * denotes a multiplication operator.

The preset M sequence may be defined as follows.

$M=\{-1,-1,-1,1,1,1,-1,1,1,1,-1,1,1,-1,1\}$

The preset M sequence may be the same as the M sequence defined in 801.11ax.

The first sequence (that is {M −1−M−1M−1M0−M1−M1−M1M0−M1M1−M1−M0M−1M−1M−1−M}*(1+j)/sqrt(2)) can be mapped to frequency tones at intervals of 16 tones from the lowest tone having a tone index of −2032 to the highest tone having a tone index of +2032. When the EHT SFT sequence (or the first sequence) is mapped to a frequency tone (or subcarrier) corresponding to the 320 MHz band in units of 16 frequency tones, an Inverse Fast Fourier Transform (IFFT) may be performed to generate a time domain signal of 12.8 us in which the same signal with a period of 0.8 us is repeated 16 times. At this time, it is possible to create a 1×STF signal of 4 us by repeating the 0.8 us signal only 5 times. The STF signal may be the 1×STF signal. In addition, the transmitting STA may perform the IFFT in consideration of all RF units (considering all cases where one RF can transmit through the entire PPDU bandwidth or the maximum transmittable bandwidth of RF is 80/160/240/320 MHz) for the EHT SFT sequence (or the first sequence).

In addition, the EHT STF sequence for the 160+160 MHz band may consist of a second sequence for a primary 160 MHz channel and a third sequence for a secondary 160 MHz channel.

The second sequence may be defined as follows.

{M−1 −M−1 M−1 M 0 −M 1 −M 1 −M 1 M}*(1+j)/sqrt(2)

The third sequence may be defined as follows.

{−M1M1−M1−M0M−1M−1M−1−M}*(1+j)/sqrt(2)

The second and third sequences may be mapped to frequency tones at intervals of 16 tones from the lowest tone having a tone index of −1008 to the highest tone having a tone index of +1008.

The 320 MHz band may include a lower 160 MHz channel having a relatively low tone index and a higher 160 MHz channel having a relatively high tone index.

In detail, the first sequence may be generated by applying a phase rotation in units of 80 MHz to the sequence for the higher 160 MHz channel in the fourth sequence in which the High Efficiency (HE) STF sequence for the 160 MHz band is repeated. The HE STF sequence for the 160 MHz band may be an optimized 160 MHz 1× HE STF sequence (i.e., {M −1−M−1M−1M0−M1−M1−M1M}*(1+j)/sqrt(2)).

The fourth sequence may be defined as follows.

{M−1 −M−1 M−1 M 0 −M 1 −M 1 −M 1 M 0 M−1 −M−1 M−1 M 0 −M 1 −M 1 −M 1 M}*(1+j)/sqrt(2)

The phase rotation may be applied to a sequence for an 80 MHz channel having a low tone index and an 80 MHz channel having a high tone index in the higher 160 MHz channel That is, the phase rotation can be applied for both 80 MHz channels. In this case, the value of the phase rotation may be −1. That is, in the fourth sequence, if the sequence for the higher 160 MHz channel that is {M −1−M−1M−1M0−M1−M1−M1M}*(1+j)/sqrt(2)) is multiplied by −1, the first sequence (i.e., {M −1−M−1M−1M0−M1−M1−M1M0−M1M1−M1−M0M−1M−1M−1−M}*(1+j)/sqrt(2)) may be obtained.

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

4. Apparatus Configuration

Figure 26:
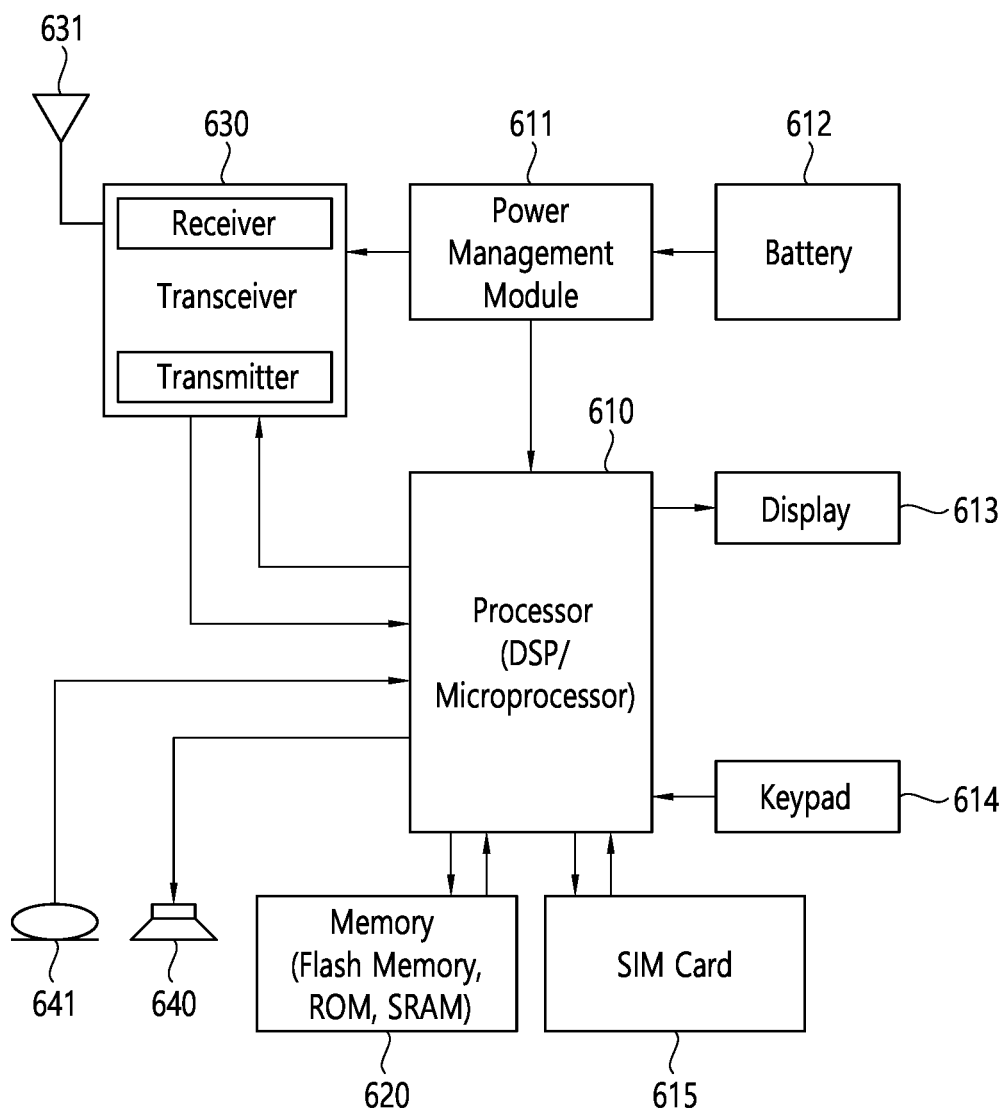
FIG. 26 shows a wireless apparatus to which the technical features of the present disclosure can be applied.

FIG. 26 shows a modified example of a transmitting apparatus and/or a receiving apparatus of the present specification.

Each apparatus/STA of the sub-drawings (a)/(b) of FIG. 1 may be modified as shown in FIG. 26. The transceiver 630 of FIG. 26 may be the same as the transceivers 113 and 123 of FIG. 1. The transceiver 630 of FIG. 26 may include a receiver and a transmitter.

The processor 610 of FIG. 26 may be the same as the processors 111 and 121 of FIG. 1. Alternatively, the processor 610 of FIG. 26 may be the same as the processing chips 114 and 124 of FIG. 1.

A memory 620 of FIG. 26 may be identical to the memories 112 and 122 of FIG. 1. Alternatively, the memory 620 of FIG. 26 may be a separate external memory different from the memories 112 and 122 of FIG. 1.

Referring to FIG. 26, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 26, a speaker 640 may output a result related to a sound processed by the processor 610. A microphone 641 may receive an input related to a sound to be used by the processor 610.

The technical features of the present specification described above may be applied to various apparatuses and methods. For example, the above-described technical features of the present specification may be performed/supported through the apparatus of FIGS. 1 and/or 26. For example, the technical features of the present specification described above may be applied only to a part of FIGS. 1 and/or 26. For example, the technical features of the present specification described above are implemented based on the processing chips 114 and 124 of FIG. 1, or implemented based on the processors 111 and 121 and the memories 112 and 122 of FIG. 1, or, may be implemented based on the processor 610 and the memory 620 of FIG. 26. For example, the apparatus of the present specification is an apparatus for transmitting/receiving an Extremely High Throughput Physical Protocol Data Unit (EHT PPDU), and the apparatus may include a memory and a processor operatively coupled to the memory. The processor may be configured to obtain an EHT PPDU transmitted through a 320 MHz band or a 160+160 MHz band from the transmitting STA, and to decode the obtained EHT PPDU.

The EHT PPDU includes a Short Training Field (STF) signal.

The STF signal is generated based on the EHT STF sequence for the 320 MHz band or the 160+160 MHz band.

The EHT STF sequence for the 320 MHz band is a first sequence in which a pre-set M sequence is repeated, and is defined as follows.

{M −1−M−1M−1M0−M1−M1−M1M0−M1M1−M1−M0M−1M−1M−1−M}*(1+j)/sqrt(2), where sqrt( ) denotes a square root. Further, * denotes a multiplication operator.

The preset M sequence may be defined as follows.

$$M=\{1-1,-1,-1,1,1,1,-1,1,1,1,-1,1,1,-1,1\}$$

The preset M sequence may be the same as the M sequence defined in 801.11ax.

The first sequence (that is {M−1−M−1M−1M0−M1−M1−M1M0−M1M1−M1−M0M−1M−1M−1−M}*(1+j)/sqrt(2)) can be mapped to frequency tones at intervals of 16 tones from the lowest tone having a tone index of −2032 to the highest tone having a tone index of +2032. When the EHT SFT sequence (or the first sequence) is mapped to a frequency tone (or subcarrier) corresponding to the 320 MHz band in units of 16 frequency tones, an Inverse Fast Fourier Transform (IFFT) may be performed to generate a time domain signal of 12.8 us in which the same signal with a period of 0.8 us is repeated 16 times. At this time, it is possible to create a 1×STF signal of 4 us by repeating the 0.8 us signal only 5 times. The STF signal may be the 1×STF signal. In addition, the transmitting STA may perform the IFFT in consideration of all RF units (considering all cases where one RF can transmit through the entire PPDU bandwidth or the maximum transmittable bandwidth of RF is 80/160/240/320 MHz) for the EHT SFT sequence (or the first sequence).

In addition, the EHT STF sequence for the 160+160 MHz band may consist of a second sequence for a primary 160 MHz channel and a third sequence for a secondary 160 MHz channel.

The second sequence may be defined as follows.

$$\{M-1\ -M-1\ M-1\ M\ 0\ -M\ 1\ -M\ 1\ -M\ 1\ M\}*(1+j)/sqrt(2)$$

The third sequence may be defined as follows.

$$\{-M\ 1\ M\ 1\ -M\ 1\ -M\ 0\ M-1\ M-1\ M-1\ -M\}*(1+j)/sqrt(2)$$

The second and third sequences may be mapped to frequency tones at intervals of 16 tones from the lowest tone having a tone index of −1008 to the highest tone having a tone index of +1008.

The 320 MHz band may include a lower 160 MHz channel having a relatively low tone index and a higher 160 MHz channel having a relatively high tone index.

In detail, the first sequence may be generated by applying a phase rotation in units of 80 MHz to the sequence for the higher 160 MHz channel in the fourth sequence in which the High Efficiency (HE) STF sequence for the 160 MHz band is repeated. The HE STF sequence for the 160 MHz band may be an optimized 160 MHz 1× HE STF sequence (i.e., {M −1−M−1M−1M0−M1−M1−M1M}*(1+j)/sqrt(2)).

The fourth sequence may be defined as follows.

$$\{M-1\ -M-1\ M-1\ M\ 0\ -M\ 1\ -M\ 1\ -M\ 1\ M\ 0\ M-1\ -M-1\ M-1\ M\ 0\ -M\ 1\ -M\ 1\ -M\ 1\ M\}*(1+j)/sqrt(2)$$

The phase rotation may be applied to a sequence for an 80 MHz channel having a low tone index and an 80 MHz channel having a high tone index in the higher 160 MHz channel. That is, the phase rotation can be applied for both 80 MHz channels. In this case, the value of the phase rotation may be −1. That is, in the fourth sequence, if the sequence for the higher 160 MHz channel that is {M −1−M−1M−1M0−M1−M1−M1M}*(1+j)/sqrt(2)) is multiplied by −1, the first sequence (i.e., {M−1−M−1M−1M0−M1−M1−M1M0−M1M1−M1−M0M−1M−1M−1−M}*(1+j)/sqrt(2)) may be obtained.

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

The technical features of the present specification may be implemented based on a computer readable medium (CRM). For example, the CRM proposed by the present specification is at least one computer readable medium including instructions based on being executed by at least one processor.

The CRM is configured to perform operations comprising receiving an Extremely High Throughput Physical Protocol Data Unit (EHT PPDU) including a Short Training Field (STF) from a transmitting STA through a 320 MHz band or a 160+160 MHz band; and decoding the EHT PPDU. The instructions stored in the CRM of the present specification may be executed by at least one processor. At least one processor related to CRM in the present specification may be the processors 111 and 121 or the processing chips 114 and 124 of FIG. 1, or the processor 610 of FIG. 26. Meanwhile, the CRM of the present specification may be the memories 112 and 122 of FIG. 1, the memory 620 of FIG. 26, or a separate external memory/storage medium/disk.

The STF signal is generated based on the EHT STF sequence for the 320 MHz band or the 160+160 MHz band.

The EHT STF sequence for the 320 MHz band is a first sequence in which a pre-set M sequence is repeated, and is defined as follows.

{M−1−M−1M−1M0−M1−M1−M1M0−M1M1−M1−M0M−1M−1M−1−M}*(1+j)/sqrt(2), where sqrt( ) denotes a square root. Further, * denotes a multiplication operator.

The preset M sequence may be defined as follows.

$M=\{-1,-1,-1,1,1,1,-1,1,1,1,-1,1,1,-1,1\}$

The preset M sequence may be the same as the M sequence defined in 801.11ax.

The first sequence (that is {M−1−M−1M−1M0−M1−M1−M1M0−M1M1−M1−M0M−1 M−1M−1−M}*(1+j)/sqrt(2)) can be mapped to frequency tones at intervals of 16 tones from the lowest tone having a tone index of −2032 to the highest tone having a tone index of +2032. When the EHT SFT sequence (or the first sequence) is mapped to a frequency tone (or subcarrier) corresponding to the 320 MHz band in units of 16 frequency tones, an Inverse Fast Fourier Transform (IFFT) may be performed to generate a time domain signal of 12.8 us in which the same signal with a period of 0.8 us is repeated 16 times. At this time, it is possible to create a 1×STF signal of 4 us by repeating the 0.8 us signal only 5 times. The STF signal may be the 1×STF signal. In addition, the transmitting STA may perform the IFFT in consideration of all RF units (considering all cases where one RF can transmit through the entire PPDU bandwidth or the maximum transmittable bandwidth of RF is 80/160/240/320 MHz) for the EHT SFT sequence (or the first sequence).

In addition, the EHT STF sequence for the 160+160 MHz band may consist of a second sequence for a primary 160 MHz channel and a third sequence for a secondary 160 MHz channel.

The second sequence may be defined as follows.

$\{M-1\ -M-1\ M-1\ M\ 0\ -M\ 1\ -M\ 1\ -M\ 1\ M\}*(1+j)/sqrt(2)$

The third sequence may be defined as follows.

$\{-M\ 1\ M\ 1\ -M\ 1\ -M\ 0\ M-1\ M-1\ M-1\ -M\}*(1+j)/sqrt(2)$

The second and third sequences may be mapped to frequency tones at intervals of 16 tones from the lowest tone having a tone index of −1008 to the highest tone having a tone index of +1008.

The 320 MHz band may include a lower 160 MHz channel having a relatively low tone index and a higher 160 MHz channel having a relatively high tone index.

In detail, the first sequence may be generated by applying a phase rotation in units of 80 MHz to the sequence for the higher 160 MHz channel in the fourth sequence in which the High Efficiency (HE) STF sequence for the 160 MHz band is repeated. The HE STF sequence for the 160 MHz band may be an optimized 160 MHz 1× HE STF sequence (i.e., {M−1−M−1M−1M0−M1−M1−M1M}*(1+j)/sqrt(2)).

The fourth sequence may be defined as follows.

$\{M-1-M-1M-1M0-M1-M1-M1M0M-1-M-1M-1M0-M1-M1\ -M1\ M\}*(1+j)/sqrt(2)$

The phase rotation may be applied to a sequence for an 80 MHz channel having a low tone index and an 80 MHz channel having a high tone index in the higher 160 MHz channel That is, the phase rotation can be applied for both 80 MHz channels. In this case, the value of the phase rotation may be −1. That is, in the fourth sequence, if the sequence for the higher 160 MHz channel that is {M−1−M−1M−1M0−M1−M1−M1 M}*(1+j)/sqrt(2)) is multiplied by −1, the first sequence (i.e., {M−1−M−1M−1M0−M1−M1−M1M0−M1M1−M1−M0M−1M−1M−1−M}*(1+j)/sqrt(2)) may be obtained.

A tone plan of the 320 MHz band or 160+160 MHz band may be determined as a repetition of a tone plan for the 160 MHz band. The tone plan for the 160 MHz band may be defined in the EHT WLAN system. The tone plan defined in the EHT WLAN system is the aforementioned tone plan.

When the tone plan for the 160 MHz band is defined as a full band, the 160 MHz band may consist of 12 guard tones, a 2020-tone RU, 5 DC tones, and 11 guard tones, based on the tone plan for the 160 MHz band. The 2020-tone RU may be an RU including 2020 tones.

When the tone plan for the 160 MHz band is defined as orthogonal frequency division multiple access (OFDMA), the 160 MHz band may consist of 12 guard tones, a 996-tone RU, a 13-tone RU, 7 DC tones, a 13-tone RU, a 996-tone RU, and 11 guard tones, based on the tone plan for the 160 MHz band. The 996-tone RU may be an RU including 996 tones, and the 13-tone RU may be an RU including 13 tones.

The 996-tone RU may consist of 484 tones, one null tone, a 26-tone RU, one null tone, and a 484-tone RU. The 484-tone RU may be an RU including 484 tones, and the 26-tone RU may be an RU including 26 tones.

In addition, in the 320 MHz band or the 160+160 MHz band, preamble puncturing may not be performed, and the EHT STF sequence may be mapped to the entire band.

The transmitting STA may have RF capability supporting the 320 MHz band or the 160+160 MHz band through one RF.

The STF signal may be used to improve automatic gain control (AGC) estimation in multiple input multiple output (MIMO) transmission.

The EHT STF sequence may be a sequence for obtaining a minimum peak-to-average power ratio (PAPR) based on the RF capability and the tone plan of the 320 MHz band or the 160+160 MHz band. That is, the present embodiment proposes an STF sequence optimized in terms of PAPR when the transmitting device supports the 320 MHz band through one RF, instead of applying preamble puncturing in the 320 MHz band which is a repetition of the tone plan for the 80 MHz band defined in the 802.11ax WLAN system. However, although only the 320 MHz band or the 160+160 MHz band is described in the present embodiment, the STF sequence optimized in terms of PAPR may also be set for the 160 MHz band or the 240 MHz band, and a related embodiment thereof has been descried above.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claim of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method of receiving an Extremely High Throughput Physical Protocol Data Unit (EHT PPDU) in a wireless LAN system, the method comprising:

receiving, by a receiving station (STA), the EHT PPDU including a Short Training Field (STF) signal from a transmitting STA through a 320 MHz band; and decoding, by the receiving STA, the EHT PPDU;

wherein the STF signal is generated based on an EHT STF sequence for the 320 MHz band and a tone plan of the 320 MHz band, wherein the EHT STF sequence for the 320 MHz band is a first sequence in which a preset M sequence is repeated, wherein the EHT STF sequence for the 320 MHz band is defined as:

{M-1-M-1 M-1 M0-M1-M1-M1M0-M1M1-M1-M0M-1M-1M-1-M}*(1+j)/sqrt(2), where sqrt( )denotes a square root, wherein the preset M sequence is defined as:

$M=\{-1,-1,-1,1,1,1,-1,1,1,1,-1,1,1,1,-1,1\}$, wherein the tone plan of the 320 MHz band is determined based on a repetition of a tone plan for a 160 MHz band, wherein based on the tone plan for the 160 MHz band defined as a full band, the 160 MHz band includes 12 guard tones, a 2020 tone resource unit (RU), 5 direct current (DC) tones, and 11 guard tones, and wherein the 2020 tone RU is an RU containing 2020 tones.

2. The method of claim 1, wherein the EHT STF sequence for the 320 MHz band is configured based on a second sequence for a Primary 160 MHz channel and a third sequence for a Secondary 160 MHz channel, wherein the second sequence is defined as:

{M-1-M-1M-1M0-M1-M1-M1M}*(1+j)/sqrt(2), wherein the third sequence is defined as {-M1M1-M1-M0M-1M-1M-1-M}*(1+j)/sqrt(2).

3. The method of claim 2, wherein the first sequence is mapped to frequency tones at intervals of 16 tones from a lowest tone having a tone index of −2032 to a highest tone having a tone index of +2032, and wherein the second and third sequences are mapped to frequency tones at intervals of 16 tones from a lowest tone having a tone index of −1008 to a highest tone having a tone index of +1008.

4. The method of claim 3, wherein the 320 MHz band includes a lower 160 MHz channel having a relatively low tone index and a higher 160 MHz channel having a relatively high tone index, wherein the first sequence is generated by applying a phase rotation in units of 80 MHz to a sequence of the higher 160 MHz channel in a fourth sequence in which a High Efficiency (HE) STF sequence for the 160 MHz band is repeated, wherein the fourth sequence is defined as follows, {M-1-M-1M-1M   0-M1-M1-M1M0M-1-M-1M-1M0-M1-M1-M1M}*(1+j)/sqrt(2), wherein the phase rotation is applied to a sequence for an 80 MHz channel having a low tone index and an 80 MHz channel having a high tone index in the higher 160 MHz channel, wherein a value of the phase rotation is set to '−1'.

5. The method of claim 2, wherein the tone plan for the 160 MHz band is defined in an Extremely High Throughput (EHT) wireless LAN system.

6. The method of claim 5, wherein based on the tone plan for the 160 MHz band defined as Orthogonal Frequency Division multiple access (OFDMA), the 160 MHz band of includes 12 guard tones, 996 ton RU, 13 ton RU, 7 DC, 13 ton RU, 996 ton RU, and 11 guard tones, wherein the 996 tone RU is an RU including 996 tones and the 13 tone RU is an RU including 13 tones.

7. The method of claim 6, wherein the 996 tone RU consists of 484 tones, one null tone, 26 tone RU, one null tone and 484 tone RU, wherein the 484 tone RU is an RU including 484 tones, and the 26 tone RU is an RU including 26 tones.

8. The method of claim 5, wherein the transmitting STA has a Radio Frequency (RF) capability to support the 320 MHz band with one RF.

9. The method of claim 8, wherein the STF signal is used to improve automatic gain control (AGC) estimation in multiple input multiple output (MIMO) transmission, wherein the EHT STF sequence is a sequence for obtaining a minimum Peak-to-Average Power Radio (PAPR) based on the tone plan and the RF capability of the 320 MHz band.

10. A receiving station (STA) receiving an Extremely High Throughput Physical Protocol Data Unit (EHT PPDU) in a wireless LAN system, the receiving STA comprising:

a memory;

a transceiver;

a processor operatively connected to the memory and transceiver, wherein the processor is configured to:

receive the EHT PPDU including a Short Training Field (STF) from a transmitting STA through a 320 MHz band, decode the EHT PPDU, wherein the STF signal is generated based on an EHT STF sequence for the 320 MHz band and a tone plan of the 320 MHz band, wherein the EHT STF sequence for the 320 MHz band is a first sequence in which a preset M sequence is repeated, wherein the EHT STF sequence for the 320 MHz band is defined as:

{M−1−M−1M−1M0−M1−M1−M1M0−M1M1−M1−M0M−1M−1M−1−M}*(1+j)/sqrt(2), where sqrt( ) denotes a square root, wherein the preset M sequence is defined as:

$M=\{-1,-1,-1,1,1,1,-1,1,1,1,-1,1,1,-1,1\}$, wherein the tone plan of the 320 MHz band is determined based on a repetition of a tone plan for a 160 MHz band, wherein based on the tone plan for the 160 MHz band defined as a full band, the 160 MHz band includes 12 guard tones, a 2020 tone resource unit (RU), 5 direct current (DC) tones, and 11 guard tones, and wherein the 2020 tone RU is an RU containing 2020 tones.

11. A method of transmitting an Extremely High Throughput Physical Protocol Data Unit (EHT PPDU) in a wireless LAN system, the method comprising:

generating, by a transmitting station (STA), a Short Training Field (STF) signal; and transmitting, by the transmitting STA, the EHT PPDU including the STF signal to a receiving STA through a 320 MHz band, wherein the STF signal is generated based on an EHT STF sequence for the 320 MHZ band and a tone plan of the 320 MHz band, wherein the EHT STF sequence for the 320 MHz band is a first sequence in which a preset M sequence is repeated, wherein the EHT STF sequence for the 320 MHz band is defined as:

{M−1−M−1M−1M0−M1−M1−M1M0−M 1M1−M1−M0M−1M−1M−1−M}*(1+j)/sqrt(2), where sqrt( ) denotes a square root, wherein the preset M sequence is defined as:

$M=\{-1,-1,-1,1,1,1,-1,1,1,1,-1,1,1,-1,1\}$, wherein the tone plan of the 320 MHz band is determined based on a repetition of a tone plan for a 160 MHz band, wherein based on the tone plan for the 160 MHz band defined as a full band, the 160 MHz band includes 12 guard tones, a 2020 tone resource unit (RU), 5 direct current (DC) tones, and 11 guard tones, and wherein the 2020 tone RU is an RU containing 2020 tones.

12. The method of claim 11, wherein the EHT STF sequence for the 320 MHz band is configured based on a second sequence for a Primary 160 MHz channel and a third sequence for a Secondary 160 MHz channel, wherein the second sequence is defined as:
{M−1−M−1M−1M0−M1−M1−M1M}*(1+j)/sqrt(2), wherein the third sequence is defined as
{−M1M1−M1−M0M−1M−1M−1−M}*(1+j)/sqrt(2).

13. The method of claim 12, wherein the first sequence is mapped to frequency tones at intervals of 16 tones from a lowest tone having a tone index of −2032 to a highest tone having a tone index of +2032, and wherein the second and third sequences are mapped to frequency tones at intervals of 16 tones from a lowest tone having a tone index of −1008 to a highest tone having a tone index of +1008.

14. The method of claim 13, wherein the 320 MHz band includes a lower 160 MHz channel having a relatively low tone index and a higher 160 MHz channel having a relatively high tone index, wherein the first sequence is generated by applying a phase rotation in units of 80 MHz to a sequence of the higher 160 MHz channel in a fourth sequence in which a High Efficiency (HE) STF sequence for the 160 MHz band is repeated, wherein the fourth sequence is defined as follows,
{M−1−M−1M−1M0−M1−M1−M1M0M−1−M−1M−1M0−M1−M1−M1M}*(1+j)/sqrt(2), wherein the phase rotation is applied to a sequence for an 80 MHz channel having a low tone index and an 80 MHz channel having a high tone index in the higher 160 MHz channel, wherein a value of the phase rotation is set to '−1'.

15. The method of claim 12, wherein the tone plan for the 160 MHz band is defined in an Extremely High Throughput (EHT) wireless LAN system.

16. The method of claim 15, wherein based on the tone plan for the 160 MHz band defined as Orthogonal Frequency Division multiple access (OFDMA), the 160 MHz band includes 12 guard tones, 996 ton RU, 13 ton RU, 7 DC, 13 ton RU, 996 ton RU, and 11 guard tones, wherein the 996 tone RU is an RU including 996 tones and the 13 tone RU is an RU including 13 tones.

17. The method of claim 16, wherein the 996 tone RU consists of 484 tones, one null tone, 26 tone RU, one null tone and 484 tone RU, wherein the 484 tone RU is an RU including 484 tones, and the 26 tone RU is an RU including 26 tones.

18. The method of claim 15, wherein the transmitting STA has a Radio Frequency (RF) capability to support the 320 MHz band with one RF.

* * * * *